(12) United States Patent
Elshafie et al.

(10) Patent No.: US 12,542,588 B2
(45) Date of Patent: Feb. 3, 2026

(54) SIDELINK REFERENCE SIGNALS AND CHANNEL STATE INFORMATION REPORTS FOR USE WITH REFLECTIVE DEVICES

(71) Applicant: QUALCOMM Incorporated, San Diego, CA (US)

(72) Inventors: Ahmed Elshafie, San Diego, CA (US); Wanshi Chen, San Diego, CA (US); Yu Zhang, San Diego, CA (US); Seyedkianoush Hosseini, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/188,019

(22) Filed: Mar. 22, 2023

(65) Prior Publication Data
US 2024/0322876 A1    Sep. 26, 2024

(51) Int. Cl.
*H04B 7/06* (2006.01)
*H04L 5/00* (2006.01)

(52) U.S. Cl.
CPC ........... *H04B 7/0626* (2013.01); *H04B 7/063* (2013.01); *H04B 7/0632* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2021/0014831 A1* | 1/2021 | Ryu | H04W 72/02 |
| 2022/0173854 A1* | 6/2022 | Chae | H04L 1/1896 |
| 2024/0090050 A1* | 3/2024 | Fujishiro | H04W 76/10 |

OTHER PUBLICATIONS

3GPP: "3rd Generation Partnership Project, Technical Specification Group Radio Access Network, NR, Medium Access Control (MAC) protocol specification (Release 17)", 3GPP TS 38.321, V17.3.0, Dec. 2022, pp. 1-249.
3GPP: "3rd Generation Partnership Project, Technical Specification Group Radio Access Network, NR, Physical layer procedures for data (Release 17)", 3GPP TS 38.214, V17.4.0, Dec. 2022, pp. 1-230.

* cited by examiner

*Primary Examiner* — Minh Trang T Nguyen
(74) *Attorney, Agent, or Firm* — Paul M. McAdams; Shumaker & Sieffert, PA

(57) ABSTRACT

A first user equipment (UE) for wireless communication may be configured to send, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity. The first UE may receive, from the second UE, one or more channel state information (CSI) reports, wherein each CSI report of the one or more CSI reports corresponds to a respective SL-RS of the plurality of SL-RSs.

34 Claims, 22 Drawing Sheets

| Report ID 0 | Report ID 1 | Report ID 2 | Report ID 3 | Report ID 4 | Report ID 5 | Report ID 6 | Report ID 7 |
|---|---|---|---|---|---|---|---|
| RI | CQI | | | | RSRP | | |
| RI | CQI | | | | RSRP | | |
| ... | ... | ... | ... | ... | ... | ... | ... |
| RI | CQI | | | | RSRP | | |

FIG. 8

| Bits | Representation |
|---|---|
| 00 | RD OFF CQI<10, RD ON 10<CQI<12 |
| 01 | RD OFF 10<CQI<14, RD ON CQI<10 |
| 10 | RD OFF 15<CQI<20, RD ON CQI<10 |
| 11 | RD OFF CQI<10, RD ON 14<CQI<20 |

FIG. 18

SIDELINK REFERENCE SIGNALS AND CHANNEL STATE INFORMATION REPORTS FOR USE WITH REFLECTIVE DEVICES

TECHNICAL FIELD

This disclosure relates generally to wireless communication systems, and more particularly, to techniques for signaling reference signals in sidelink for use with reflective devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Wireless communication systems may also be configured to communicate with one or more reflective devices. Reflective devices may include a reconfigurable intelligent surface (RIS), a reflective surface, a backscattering-capable device, a radio frequency (RF) tag, a passive user equipment (UE), a backscatter UE, or an ambient Internet-of-Things (IoT) device. In general, a reflective device may be an example of a passive device that can reflect, refract, or otherwise passively steer signals in a desired direction.

As the demand for mobile broadband access continues to increase, research and development continue to advance wireless communication technologies not only to meet the growing demand for mobile broadband access, but to advance and enhance the user experience with mobile communications.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. Unless expressly described, no one aspect or feature is essential to achieve technical effects or solutions discussed herein.

In examples of the disclosure, two UEs may be configured to communicate with each other in sidelink. In some circumstances, the UEs may be configured to communicate with each other directly. In other circumstances the UEs may be configured to communicate with each other in sidelink through a reflective device (e.g., a RIS). To support the determination of transmission parameters and/or training the reflective device, this disclosure describes techniques that include sending two or more types of sidelink reference signals (SL-RSs) from a transmitting UE to a receiving UE.

The two or more types of SL-RSs may include a first SL-RS based on a first operational state of the reflective device. For example, the first operational state of the reflective device may correspond with the reflective device being active. That is, first SL-RS is configured to be sent between two UEs through a reflective device. The two or more types of SL-RSs may further include a second SL-RS based on a second operational state of the reflective device. For example, the second operational state of the reflective device may correspond with the reflective device being inactive. That is, second SL-RS is configured to be sent directly between the transmitting UE and the receiving UE.

In addition to supporting different types of SL-RSs, the techniques of this disclosure may also include control signaling that indicates to the receiving UE to generate and transmit different types of channel state information (CSI) reports corresponding to a specific type of SL-RS. For example, the data in the CSI report when receiving and measuring an SL-RS that is sent through a reflective device may include more and/or different types of measurements and analysis compared to legacy CSI reports based on SL-RSs that are sent directly between UEs. By supporting different types of SL-RSs and CSI reports for situations where a reflective device may be in use, the techniques of this disclosure may allow for more accurate determination of transmission parameters, reflective device training, better data throughput, and more reliable communications for UEs communication in sidelink.

In one example, this disclosure describes a first UE for wireless communication, the first UE comprising a processor, and a memory accessible by the processor, wherein, the processor is configured to send, to a second UE, a plurality of SL-RSs, wherein the first UE and the second UE are configurable to communicate with a network entity, and wherein the plurality of SL-RSs includes a first SL-RS corresponding to a first operational state of the network entity, receive, from the second UE, one or more CSI reports, wherein each CSI report of the one or more CSI reports corresponds to a respective SL-RS of the plurality of SL-RSs, and send information based on one or more CSI reports of the one or more CSI reports.

In another example, this disclosure describes a method for wireless communication by a first UE, the method comprising sending, to a second UE, a plurality of SL-RSs, wherein the first UE and the second UE are configurable to communicate with a network entity, and wherein the plurality of SL-RSs includes a first SL-RS corresponding to a first operational state of the network entity, receiving, from the second UE, one or more CSI reports, wherein each CSI report of the one or more CSI reports corresponds to a respective SL-RS of the plurality of SL-RSs, and sending information based on one or more CSI reports of the one or more CSI reports.

In another example, this disclosure describes a first UE for wireless communication, the first UE comprising means for sending, to a second UE, a plurality of SL-RSs, wherein the first UE and the second UE are configurable to communicate with a network entity, and wherein the plurality of SL-RSs includes a first SL-RS corresponding to a first operational state of the network entity, means for receiving, from the second UE, one or more CSI reports, wherein each CSI report of the one or more CSI reports corresponds to a respective SL-RS of the plurality of SL-RSs, and means for sending information based on one or more CSI reports of the one or more CSI reports.

In another example, this disclosure describes a non-transitory computer-readable storage medium storing instructions that, when executed cause one or more processors of a first UE to send, to a second UE, a plurality of SL-RSs, wherein the first UE and the second UE are configurable to communicate with a network entity, and wherein the plurality of SL-RSs includes a first SL-RS corresponding to a first operational state of the network entity, receive, from the second UE, one or more CSI reports, wherein each CSI report of the one or more CSI reports corresponds to a respective SL-RS of the plurality of SL-RSs, and send information based on one or more CSI reports of the one or more CSI reports.

In another example, this disclosure describes a first UE for wireless communication, the first UE comprising a processor, and a memory accessible by the processor, wherein, the processor is configured to receive, from a second UE, a plurality of SL-RSs, wherein the first UE and the second UE are configurable to communicate with a network entity, and wherein the plurality of SL-RSs includes a first SL-RS corresponding to a first operational state of the network entity, generate one or more CSI reports, wherein each CSI report of the one or more CSI reports corresponds to a respective SL-RS of the plurality of SL-RSs, and send, to the second UE, the one or more CSI reports.

In another example, this disclosure describes a method for wireless communication by a first UE, the method comprising receiving, from a second UE, a plurality of SL-RSs, wherein the first UE and the second UE are configurable to communicate with a network entity, and wherein the plurality of SL-RSs includes a first SL-RS corresponding to a first operational state of the network entity, generating one or more CSI reports, wherein each CSI report of the one or more CSI reports corresponds to a respective SL-RS of the plurality of SL-RSs, and sending, to the second UE, the one or more CSI reports.

In another example, this disclosure describes a first UE for wireless communication, the first UE comprising means for receiving, from a second UE, a plurality of SL-RSs, wherein the first UE and the second UE are configurable to communicate with a network entity, and wherein the plurality of SL-RSs includes a first SL-RS corresponding to a first operational state of the network entity, means for generating one or more CSI reports, wherein each CSI report of the one or more CSI reports corresponds to a respective SL-RS of the plurality of SL-RSs, and means for sending, to the second UE, the one or more CSI reports.

In another example, this disclosure describes a non-transitory computer-readable storage medium storing instructions that, when executed cause one or more processors of a first UE to receive, from a second UE, a plurality of SL-RSs, wherein the first UE and the second UE are configurable to communicate with a network entity, and wherein the plurality of SL-RSs includes a first SL-RS corresponding to a first operational state of the network entity, generate one or more CSI reports, wherein each CSI report of the one or more CSI reports corresponds to a respective SL-RS of the plurality of SL-RSs, and send, to the second UE, the one or more CSI reports.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF DRAWINGS

FIG. 8 illustrates one example of a multi-entry CSI report in accordance with one or more aspects of the present disclosure.

FIG. 18 illustrates an example of joint encoding for a single-entry CSI report in accordance with one or more aspects of the present disclosure.

DETAILED DESCRIPTION

Figure 1:
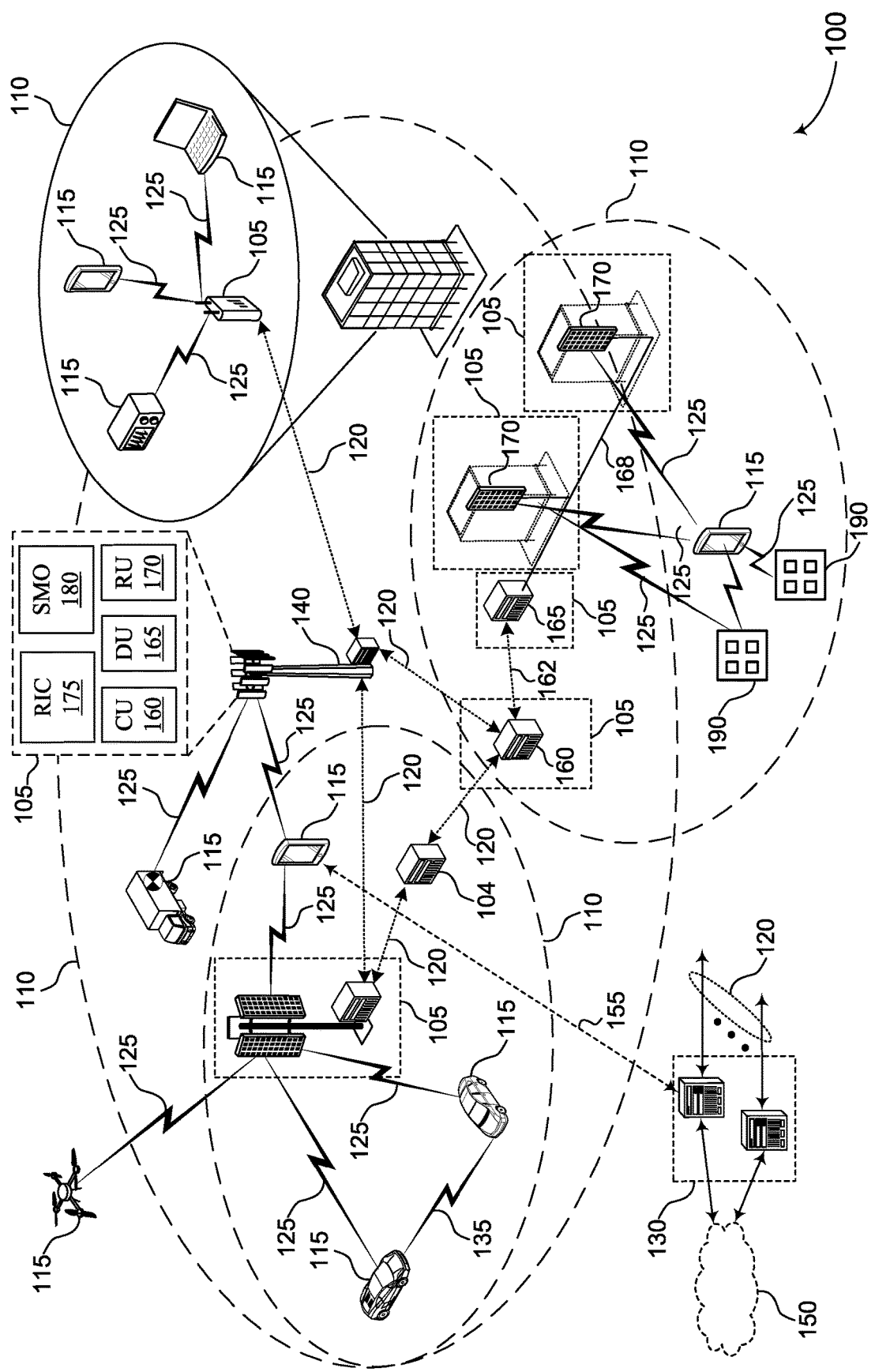
FIG. 1 illustrates an example of a wireless communications system 100 that supports multiple types of side-link reference signals and CSI reports for UEs communicating in sidelink in accordance with one or more aspects of the present disclosure.

Wireless communications systems may include multiple communication devices such as user equipment (UEs) and base stations (e.g., network entities), which may provide wireless communication services to the UEs. For example, such base stations may be next-generation NodeBs or gigaNodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support reference signal transmission, reception, and reporting.

UEs and network entities of a wireless communication system may be configured to communicate with one or more reflective devices. Reflective devices may include a reconfigurable intelligent surface (RIS), a reflective surface, a backscattering-capable device, a radio frequency (RF) tag, a passive user equipment (UE), a backscatter UE, or an ambient Internet-of-Things (IoT) device. In general, a reflective device may be an example of a passive device that can reflect, refract, or otherwise passively steer signals in a desired direction.

In some wireless communications systems, a reflective device, such as a RIS, may be used to increase cell coverage and channel diversity. In some cases, a RIS may not actively decode, encode, amplify, or otherwise process signals that are reflected by the RIS. For example, a RIS may have a configurable (e.g., controllable) index (e.g., angle) of reflection or refraction (e.g., based on configurable properties, such as electromagnetic properties or electromechanical properties). A controller of the RIS may configure (e.g., adjust) the RIS to control the direction of reflection or refraction. As a more specific example, a RIS controller may adjust various gratings on a RIS (e.g., a spacing, an orientation, or another property of the gratings) to steer incident waves in a desired direction.

In examples of the disclosure, two UEs may be configured to communicate with each other in sidelink. In some circumstances, the UEs may be configured to communicate with each other directly. In other circumstances the UEs may be configured to communicate with each other in sidelink through a reflective device (e.g., a RIS). However, current example techniques for determining the state of the channel between two UEs in sidelink only supports a single sidelink reference signal (SL-RS). Such a single SL-RS may not be adequate to determine the channel state in the circumstance where the two UEs in communication in sidelink are using a reflective device.

This disclosure describes techniques that may address one or more of the problems described above for UEs communicating in sidelink where the UEs may also be communicating with and/or through a reflective device. For example, to support the determination of transmission parameters and/or training the reflective device, this disclosure describes techniques that include sending two or more types of SL-RSs from a transmitting UE to a receiving UE.

The two or more types of SL-RSs may include a first SL-RS based on a first operational state of the reflective device. For example, the first operational state of the reflective device may correspond with the reflective device being active. That is, first SL-RS is configured to be sent between two UEs through a reflective device. The two or more types of SL-RSs may further include a second SL-RS based on a second operational state of the reflective device. For example, the second operational state of the reflective device may correspond with the reflective device being inactive. That is, second SL-RS is configured to be sent directly between the transmitting UE and the receiving UE.

In addition to supporting different types of SL-RSs, the techniques of this disclosure may also include control signaling that indicates to the receiving UE to generate and transmit different types of channel state information (CSI) reports corresponding to a specific type of SL-RS. For example, the data in the CSI report when receiving and measuring an SL-RS that is sent through a reflective device may include more and/or different types of measurements and analysis compared to legacy CSI reports based on SL-RSs that are sent directly between UEs. By supporting different types of SL-RSs and CSI reports for situations where a reflective device may be in use, the techniques of this disclosure may allow for more accurate determination of transmission parameters, reflective device training, better data throughput, and more reliable communications for UEs communication in sidelink.

FIG. 1 illustrates an example of a wireless communications system 100 that supports multiple types of side-link reference signals and CSI reports for UEs communicating in sidelink, with and without the use of a reflective device, in accordance with one or more aspects of the present disclosure. The wireless communications system 100 may include one or more network entities 105, one or more UEs 115, one or more reflective device 190, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a network node, a base station, a gNB, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node.

In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support the processing of reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, a network node, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHZ to 30 GHZ, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, sidelink signals may be used between two UEs 115 without necessarily relying on scheduling or control information from a network entity 105. For example, two or more UEs 115 may communicate with each other using peer to peer (P2P) or sidelink signals without relaying that communication through a network entity 105. In a further example, one UE 115 may operate as a scheduling entity or a primary sidelink device for other UEs.

Wireless communication system 100 may also be configured to communicate with one or more reflective devices 190. Reflective devices may include a reconfigurable intelligent surface (RIS), a reflective surface, a backscattering-capable device, a radio frequency (RF) tag, a passive user equipment (UE), a backscatter UE, or an ambient Internet-of-Things (IoT) device. In general, a reflective device 190 may be an example of a passive device that can reflect, refract, or otherwise passively steer signals in a desired direction. In some examples, as will be explained in more detail below, multiple UEs 115 may communicate with each other in sidelink using one or more reflective devices 190 to reflect sidelink communication signals. In general, any of reflective device 190 may be generically referred to as a network entity.

A reflective device 190, such as a RIS, may be used to increase cell coverage and channel diversity. In some cases, a RIS may not actively decode, encode, amplify, or otherwise process signals that are reflected by the RIS. For example, a RIS may have a configurable (e.g., controllable) index (e.g., angle) of reflection or refraction (e.g., based on configurable properties, such as electromagnetic properties or electromechanical properties). A controller of the RIS may configure (e.g., adjust) the RIS to control the direction of reflection or refraction. As a more specific example, a RIS controller may adjust various gratings on a RIS (e.g., a spacing, an orientation, or another property of the gratings) to steer incident waves in a desired direction.

In examples of the disclosure, two or more UEs 115 may be configured to communicate with each other in sidelink. In some circumstances, the UEs 115 may be configured to communicate with each other directly. In other circumstances the UEs 115 may be configured to communicate with each other in sidelink through a reflective device 190 (e.g., a RIS). However, current example techniques for determining the state of the channel between two UEs 115 in sidelink only supports a single sidelink reference signal (SL-RS). Such a single SL-RS may not be adequate to determine the channel state in the circumstance where the two UEs 115 in communication in sidelink are using a reflective device 190.

This disclosure describes techniques that may address one or more of the problems described above for UEs 115 communicating in sidelink where the UEs 115 may also be communicating with and/or through a reflective device 190. For example, to support the determination of transmission parameters and/or training the reflective device 190, this disclosure describes techniques that include sending two or more types of SL-RSs from a transmitting UE 115 to a receiving UE 115. In the examples below, the transmitting UE 115 will be referred to as transmitting UE 115a or UE 115a. The transmitting UE 115a is generally the UE that is configured to send the SL-RSs and request CSI reports. The receiving UE 115 may be referred to as receiving UE 115b or UE 115b. The receiving UE 115b is generally the UE that is configured to receive the SL-RSs and generate and send corresponding CSI reports. Of course, any single UE may be configured to operate both as a transmitting UE or receiving UE based on whether or not the UE is sending or receiving the SL-RSs.

The two or more types of SL-RSs may include a first SL-RS based on a first operational state of the reflective device. For example, the first operational state of the reflective device may correspond with the reflective device being active. That is, first SL-RS is configured to be sent between two UEs 115 through a reflective device 190. The two or more types of SL-RSs may further include a second SL-RS based on a second operational state of the reflective device. For example, the second operational state of the reflective device may correspond with the reflective device 190 being inactive. That is, second SL-RS is configured to be sent directly between the transmitting UE 115a and the receiving UE 115b.

In addition to supporting different types of SL-RSs, the techniques of this disclosure may also include control signaling that indicates to the receiving UE 115b to generate and transmit different types of channel state information (CSI) reports corresponding to a specific type of SL-RS. For example, the data in the CSI report when receiving and measuring an SL-RS that is sent through a reflective device 190 may include more and/or different types of measurements and analysis compared to legacy CSI reports based on SL-RSs that are sent directly between UEs 115. By supporting different types of SL-RSs and CSI reports for situations where a reflective device 190 may be in use, the techniques of this disclosure may allow for more accurate determination of transmission parameters, reflective device training, better data throughput, and more reliable communications for UEs communication in sidelink.

As will be explained in more detail below, in one example of the disclosure a first UE 115 (e.g., a transmitting UE 115a) may be configured to send, to a second UE 115 (e.g., a receiving UE 115b), a plurality of SL-RSs, wherein the first UE 115 and the second UE 115 are configurable to communicate with a network entity (e.g., a reflective device 190), and wherein the plurality of SL-RSs includes a first SL-RS corresponding to a first operational state of the network entity, receive, from the second UE 115, one or more CSI reports, wherein each CSI report of the one or more CSI reports corresponds to a respective SL-RS of the plurality of SL-RSs, and send information based on one or more CSI reports of the one or more CSI reports.

In a reciprocal example, a first UE 115 (e.g., a receiving UE 115b) may be configured to receive, from a second UE 115 (e.g., a transmitting UE 115a), a plurality of SL-RSs, wherein the first UE 115 and the second UE 115 are configurable to communicate with a network entity (e.g., a reflective device 190), and wherein the plurality of SL-RSs includes a first SL-RS corresponding to a first operational state of the network entity, generate one or more CSI reports, wherein each CSI report of the one or more CSI reports corresponds to a respective SL-RS of the plurality of SL-RSs, and send, to the second UE 115, the one or more CSI reports.

Figure 2:
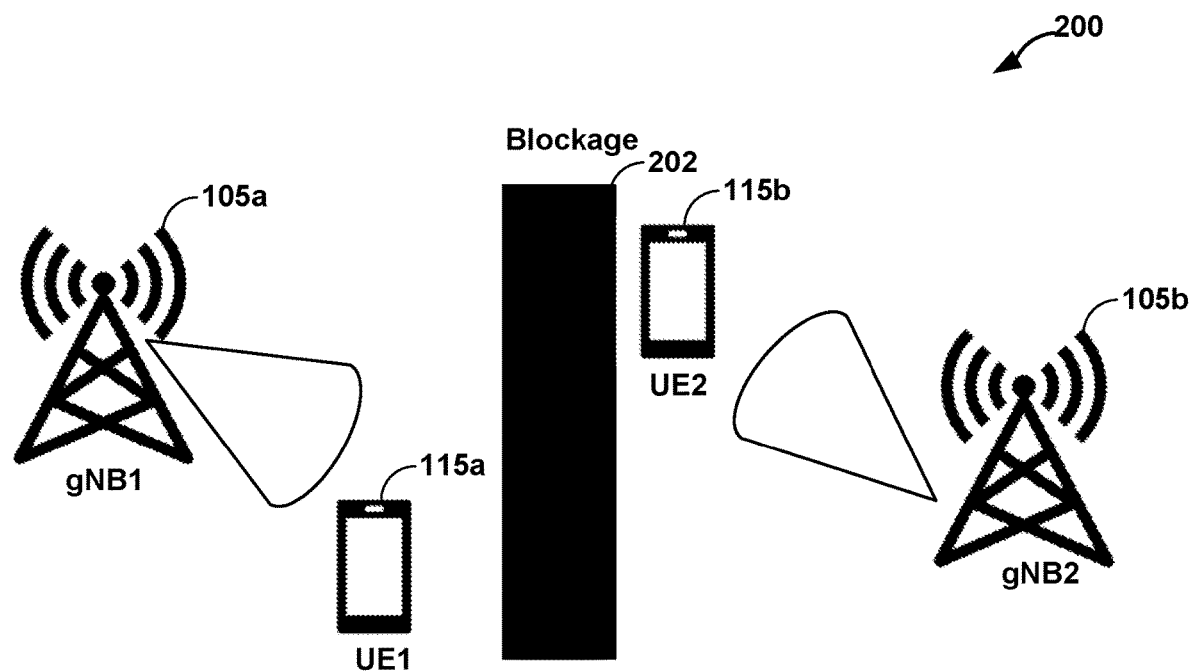
FIG. 2 illustrates example use cases for a reflective device in accordance with one or more aspects of the present disclosure.
Figure 2:
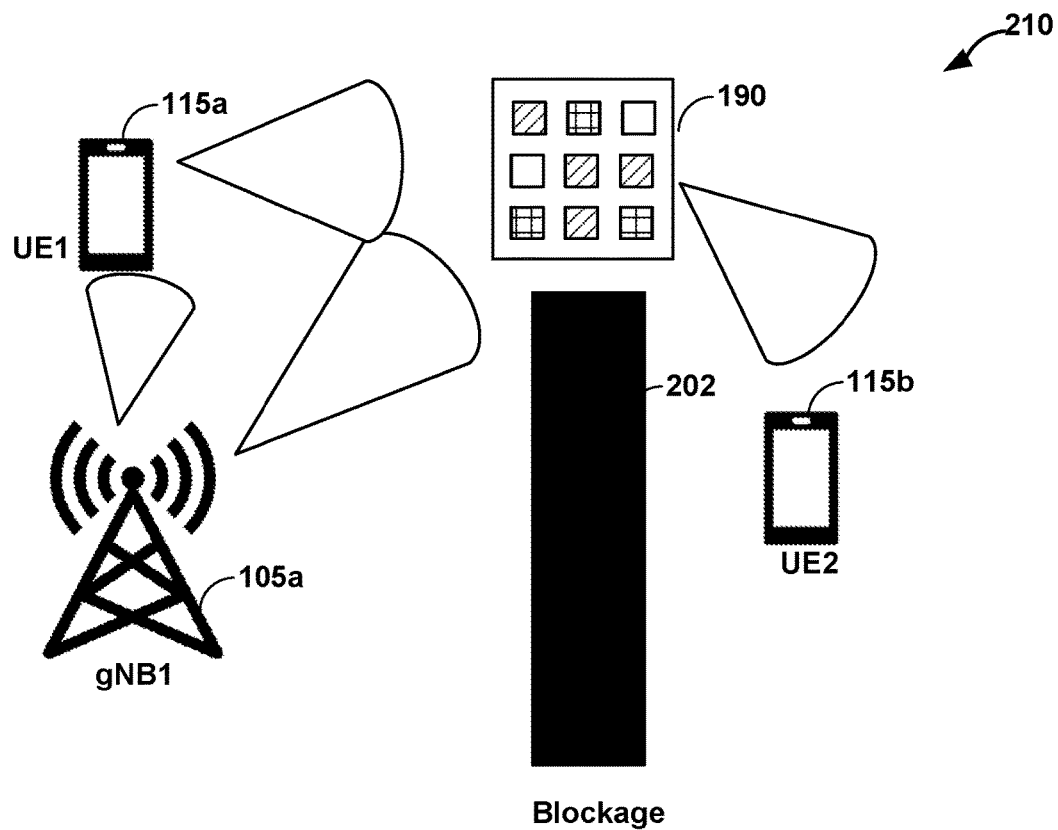

FIG. 2 illustrates example use cases for a reflective device in accordance with one or more aspects of the present disclosure. FIG. 2 illustrates a first scenario 200, where a blockage 202 exists between first UE 115a (UE1) and first network entity 105a (e.g., gNB1), and second UE 115b (UE2) and second network entity 105b (e.g., gNB2). Blockage 202 may be any physical and/or electromagnetic barrier that may prevent wireless communications. Typical examples may include buildings, automobiles, or terrain. In scenario 200, the second UE 115b is unable to communicate with either the first UE 115a or the first network entity 105a, and vice versa. Instead, the second UE 115b communicates with the second network entity 105b, thus increasing the number of network entities needed for scenario 200. In second scenario 210, a reflective device 190 is used to reflect signals from the first UE 115a or the first network entity 105a to the second UE 115b around blockage 202. In this way, it may be possible to use fewer network entities to serve UEs in an area.

In general, 5G and other wireless communication techniques may use Multiple-Input Multiple-Output (MIMO) techniques to improve throughput. MIMO techniques include the use of multiple antennas at both the transmitter and receiver sides of a wireless communication link to increase the capacity and improve the reliability of the system. In 5G, MIMO is used to achieve higher data rates, better coverage, and more efficient spectrum utilization. The use of MIMO in 5G networks has significant advantages over previous generations of wireless networks. MIMO enables higher data rates and improved spectral efficiency, which means more users can be accommodated on the same frequency band. Additionally, MIMO helps to mitigate the effects of fading and interference in the wireless channel, which can result in more reliable and robust wireless connections.

While 5G MIMO allows for increasing throughput, such increased throughput may include the use of a number of active antenna units (AAUs) to achieve higher beamforming gains. Each antenna port of the AAU may include individual RF chains. In general, the use of AAUs may result in a significant increase in power consumption. A reflective device 190, such as RIS, may be used to extend wireless coverage with negligible power consumption. In effect, the reflective device 190 may be used as passive MIMO as a substitute for AAUs at a network entity 105 or a UE 115. Reflective device 190 may be a near passive device configured to reflect an impinging communication signal (e.g., wave or beam) to a desired direction. A network entity 105 may configure the reflective device 190 to control the reflection direction.

Figure 3:
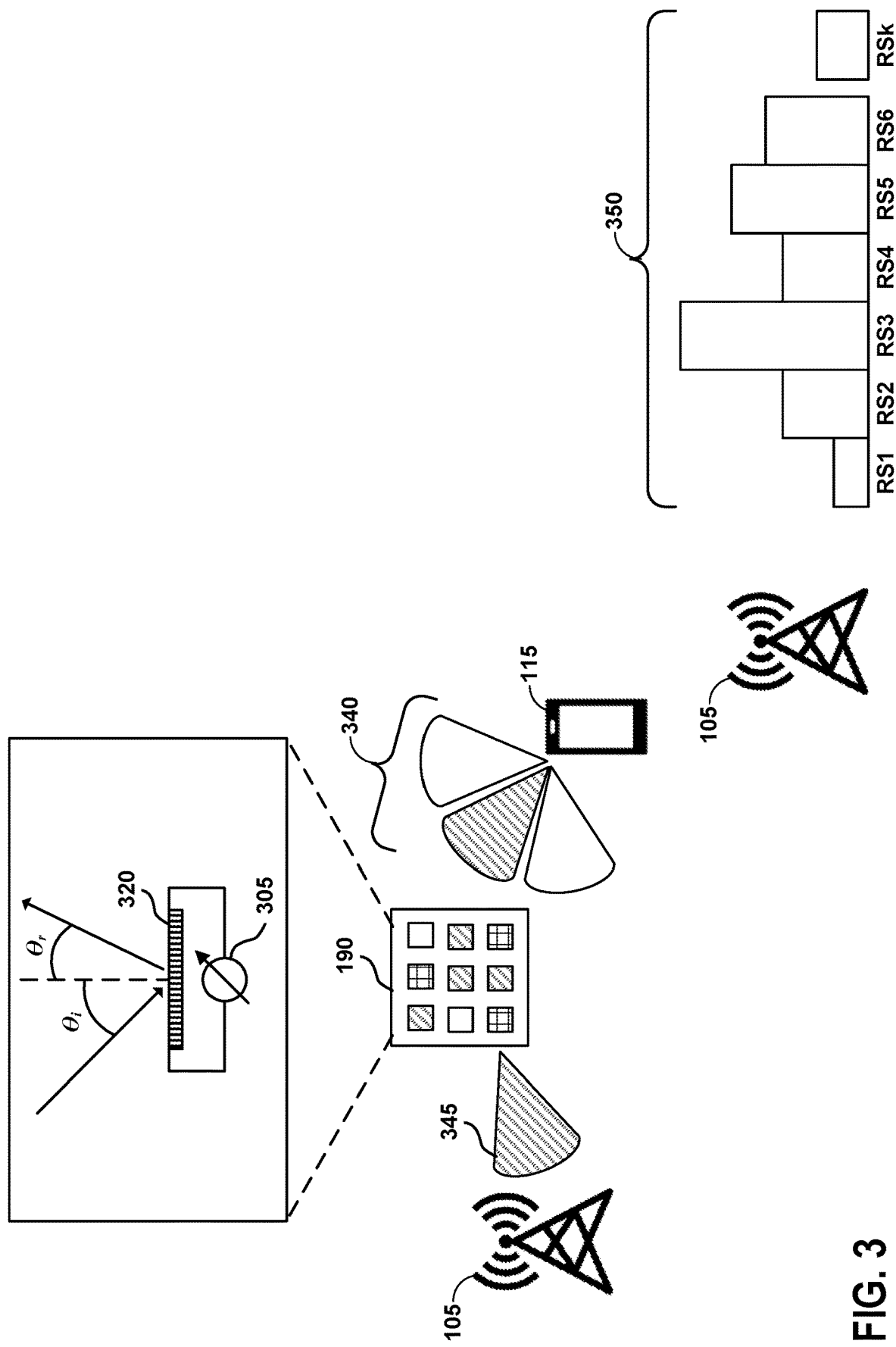
FIG. 3 illustrates an example of reflective device training in accordance with one or more aspects of the present disclosure.

FIG. 3 illustrates an example of reflective device training in accordance with one or more aspects of the present disclosure. In general, a training process for an reflective device may include determining the optimal reflection coefficients for the elements of the reflective device to direct the signal towards the desired receiver. In some examples, reflective device training may be done in two stages: initial beam training and fine-tuning. During initial beam training, the transmitter (e.g., UE 115) sends one or more training reference signals to the reflective device, which reflects the training reference signal towards the receiver (e.g., network entity 105). The receiver then measures the channel response for the training reference signals and sends configuration information to the reflective device, which adjusts the reflection coefficients of the elements of the reflective device accordingly. This process may be repeated until the best beamforming parameters are found. In the fine-tuning stage, the system continuously adapts to changes in the wireless channel to maintain the optimal beamforming parameters.

In the example of FIG. 3, a UE 115 may be configured to send a plurality of training reference signals (RSs) 340 to a reflective device 190. Note that in other examples the training reference signals 340 may be sent by the network entity 105. In addition, in other examples, the receiver of the reflected training reference signals 345 may be a UE 115, regardless of what type of device originally transmits the training reference signals 340.

In some examples, each of training reference signals 340 may be transmitted on a different beam. The reflective device 190 may reflect each of the training reference signals 340 to a network entity 105. In other examples, the reflective device 190 may reflect the training reference signals 340 to another UE 115. The reflective device 190 may be controlled by a central controller 305. The reflective device 190 may relay (e.g., deflect, refract, reflect) signals between the UE 115 and the network entity 105. For example, a wave (e.g., a training reference signal 340) may arrive at the reflective device 190 with an incident angle (e.g., $\theta_i$), and may exit the reflective device 190 (e.g., as a reflected wave) with a reflected angle (e.g., $\theta_r$). In FIG. 3, the reflective device reflects the training reference signals as reflected training reference signals 345 (RS1, RS2, RS3, . . . , RSk). The reflective device may use a different non-codebook precoder for each training reference signal occasion or transmission.

The network entity 105 is configured to perform one or more measurements on each of the received reflected training reference signals 345. The network entity 105 may compute receiver metrics 350 corresponding to each of the reflected training reference signals 345. The network entity 105 may determine the index (e.g., beam) of the best reflected training reference signal 345 as the one with the highest receiver metric. Example receiver metrics may include spectral efficiency, reference signal received power (RSRP), reference signal received quality (RSRQ), signal-to-interference noise ratio (SINR), or other receiver metrics.

The network entity 105 may send configuration information to the reflective device 190 such that the reflective device 190 may adjust the angle at which the reflective device 190 reflects waves to match the winning beam. The controller 305 of the reflective device 190 may adjust or otherwise configure directional settings of the reflective device 190. For example, the controller 305 may adjust gratings 320 on the reflective device 190 to control the angle at which waves are reflected off the reflective device 190. By adjusting the gratings 320 (e.g., by adjusting voltages, reflection coefficients, or other parameters of the reflective device 190) of the reflective device 190, the controller 305 may be capable of steering waves (e.g., signals) in a specific direction. In some examples, the controller 305 may provide a low amount of power to the surface of the reflective device 190 to improve the reflective properties of the reflective device 190 (e.g., to increase the power or quality of signals reflected by the reflective device 190). The amount of power consumed by the reflective device 190 may be negligible in comparison to power amplifiers or other active relay devices.

As described above, in some examples, multiple UEs may be in communication in sidelink. In such a situation, there may be multiple UEs in SL that may be configured to transmit through a reflective device or a subset of reflective devices (e.g., from an available set of reflective devices). Some example techniques may allow for a UE to "reserve" a reflective device for use. Once a UE reserves a reflective device, the UE can train the reflective device (e.g., using the techniques described above) and then use the reflective device for serving/communicating with other receiver UEs in sidelink.

As will be explained in more detail below, this disclosure describes techniques that may improve transmission quality, reliability, and throughput when UEs are communicating in sidelink while also using a reflective device. In particular, this disclosure describes techniques for sidelink reference signal (SL-RS) transmission and related channel state information (CSI) reporting and requesting in sidelink when a reflective device is present. This disclosure also described detailed designs for CSI reports based on the plurality of types of SL-RSs described herein. In some examples, the CSI reports are signaled in a media access control control element (MAC-CE).

CSI reporting is supported for sidelink in Release 16 of the 5G NR standard. A UE may transmits an SL-RS within a unicast physical sidelink share channel (PSSCH) transmission if CSI reporting is enabled and a CSI request is present in the sidelink control information (SCI) contained in the PSSCH. In some examples, the CSI reporting is enabled by a higher layer parameter sl-CSI-Acquisition. The CSI request in the SCI may be a "CSI request" field in the corresponding SCI (e.g., the CSI request filed in the SCI format 0-2 is set to 1).

For SL-RS transmission, parameters that indicate the number of ports for the SL-RS, the first OFDM symbol in a physical resource block (PRB) used for the SL-RS, and a frequency domain allocation for the SL-RS. In a specific example of Release 16, the following parameters may be configured by the higher layer signaling:
nrofPortsCSIRS-SL indicates the number of ports for SL SL-RS (Only 1 and 2 antenna ports are supported)
firstSymbolInTimeDomainCSIRS-SL indicates the first OFDM symbol in a PRB used for SL SL-RS
frequDomainAllocationCSIRS-SL indicates the frequency domain allocation for SL SL-RS.

In the example of Release 16 of 5G NR, an SL-RS density of 1 (e.g., resource element/port/resource block) is supported. That is, a transmitting UE 115a may only send a single SL-RS per PSSCH. In Release 16, a zero power CSI-RS (ZP-CSIRS) is not supported.

A receiving UE may receive the SL-RS and generate a CSI report. In the example of Release 16, the CSI Report includes a Channel Quality Indicator (CQI) and a Rank Indicator (RI). The CQI and RI are always reported together. The RI refers to a parameter that indicates the number of independent data streams that can be transmitted simultaneously on a particular channel. In a MIMO wireless communication system, multiple antennas are used at both the transmitter and receiver to improve the data transmission rate and reliability. The RI in a CSI report provides information about the number of spatial streams that can be supported on a particular MIMO channel.

The RI value can range from 1 to the maximum number of available antennas at the transmitter or receiver. The higher the RI value, the more spatial streams that can be transmitted on the channel, which can increase the data rate and reliability of the wireless communication link. In general, the rank indicator is a measure of antenna performance.

The CQI is a parameter that provides information about the quality of the downlink radio channel between a receive and transmitter. In this case, two UEs communicating in sidelink. The CQI value may be used by the a transmitting UE to determine the appropriate modulation and coding scheme for transmission. The modulation and coding scheme determines the data rate and reliability of the wireless communication link.

The CQI value ranges from 0 to a maximum value, which depends on the specific CQI reporting mode and the bandwidth of the channel. A higher CQI value indicates a better channel quality, which means that the UE can support higher data rates and more reliable wireless communication links.

The CQI value may be calculated based on the received signal strength, interference, and noise level on the downlink channel.

The RI and the CQI value are related because the number of spatial streams that can be transmitted on a particular MIMO channel depends on the channel quality, which is reflected in the CQI value. In other words, a higher CQI value indicates that the channel quality is better, which means that a higher RI value can be used to support more spatial streams, and thus increase the data rate and reliability of the wireless communication link.

In Release 16, a receiving UE calculates CSI parameters (if reported) assuming the following dependencies between CSI parameters (if reported):

CQI shall be calculated conditioned on the reported RI

The CSI reporting can be aperiodic. Table 1 below shows the supported combinations of CSI reporting configurations and SL-RS configurations in Release 16, and how the CSI reporting is triggered for an SL-RS configuration.

TABLE 1

Triggering/Activation of CSI reporting for the possible SL-RS Configurations

| SL-RS Configuration | Aperiodic CSI Reporting |
| --- | --- |
| Aperiodic SL-RS | Triggered by SCI |

For CSI reporting, wideband CQI reporting is supported. A wideband CQI is reported for the entire CSI reporting band (which is limited to the PSSCH transmission band).

Figure 4:
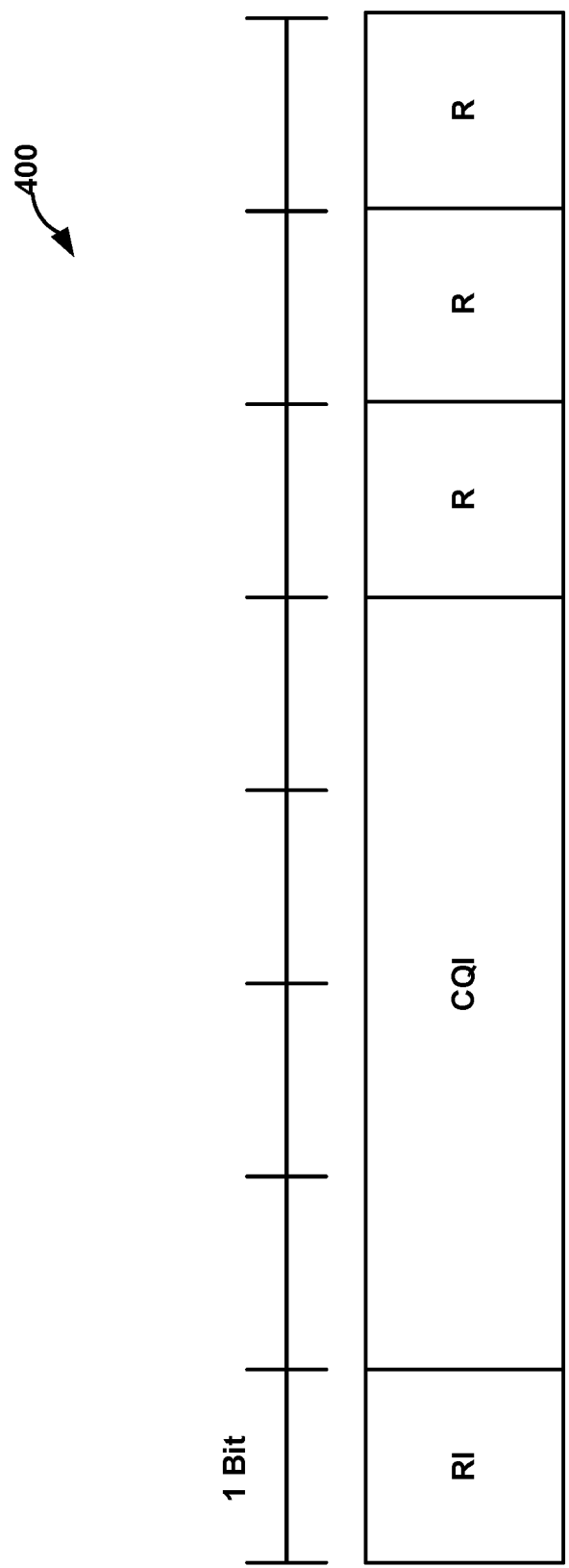
FIG. 4 illustrates an example CSI report for a SL-RS in accordance with one or more aspects of the present disclosure.

FIG. 4 illustrates an example CSI report for a SL-RS in accordance with one or more aspects of the present disclosure. FIG. 4 shows an example CSI report 400 based on an SL-RS transmitted between UEs in sidelink. CSI report 400 may be sent in a MAC-CE. In one example, the Sidelink CSI Reporting MAC-CE is identified by a MAC subheader with a logical channel ID (LCID). The priority of the Sidelink CSI Reporting MAC-CE is fixed to '1'. The Sidelink CSI Reporting MAC-CE is defined as follows:

RI: This field indicates the derived value of the Rank Indicator for sidelink CSI reporting. The length of the field is 1 bit;

CQI: This field indicates the derived value of the Channel Quality Indicator for sidelink CSI reporting. The length of the field is 4 bits;

R: Reserved bit, set to 0.

In the example of Release 16, the CSI-triggering UE (e.g., the UE sending the SL-RS) is not allowed to trigger another aperiodic CSI report for the same UE before the last slot of the expected reception or completion of the ongoing aperiodic CSI report associated with the SCI format 2-A with the "CSI request" field set to 1. To control the SL-CSI reporting procedure, radio resource control (RRC) signaling configures sl-LatencyBound-CSI-Report which is maintained for each PC5-RRC connection. The supported range is {3, . . . , 160} slots.

The MAC entity shall for each pair of the Source Layer-2 ID and the Destination Layer-2 ID corresponding to a PC5-RRC connection which has been established by upper layer:

1> if the SL-CSI reporting has been triggered by a SCI and not cancelled:
    2> if the latency requirement of the SL-CSI reporting in sl-LatencyBound-CSI-Report cannot be met:
        3> cancel the triggered SL-CSI reporting.
    2> else if the MAC entity has SL resources allocated for new transmission and the SL-SCH resources can accommodate the SL CSI reporting MAC-CE and its subheader as a result of logical channel prioritization:
        3> instruct the Multiplexing and Assembly procedure to generate a Sidelink CSI Reporting MAC CE;
        3> cancel the triggered SL-CSI reporting.
    2> else if the MAC entity has been configured with Sidelink resource allocation mode 1:
        3> trigger a Scheduling Request.

The MAC entity configured with Sidelink resource allocation mode 1 may trigger a Scheduling Request if transmission of a pending SL-CSI reporting with the sidelink grant(s) cannot fulfil the latency requirement associated to the SL-CSI reporting.

In the examples above, a transmitting UE 115a multiplexes a single SL-RS with data in a PSSCH. The transmitting UE 115a has to wait for an expiry time before requesting a CSI report from a receiving UE 115b for the same logical channel. Such a single SL-RS does not allow for measuring channel quality should the transmitting UE and receiving UE be communicating in sidelink through a reflective device. Accordingly, accurately measuring the channel quality of sidelink communications when a reflective device is being used may be difficult and/or may take a longer than desirable time, thus preventing quicker channel adaption.

In accordance with the techniques of this disclosure, a UE 115 may be configured to transmit and/or receive multiple types of SL-RSs. In particular, the various types of the multiple types of SL-RSs may be based on an operational state of a reflective device 190. As one example, the operational states of the reflective device 190 may be an active state (e.g., the UEs can or are communicating through the reflective device 190) or an inactive state (e.g., the UEs cannot or are not communicating through the reflective device 190. That is, the active state may refer to a reflective device 190 being on and available for use, without necessarily requiring the reflective device to be used. The inactive state for the reflective device 190 may indicate that the reflective device 190 is off or that the reflective device 190 is not available for use by a particular subset of UEs.

In one example, based on a capability of a receiving UE (e.g., UE 115b of FIG. 2) to process more than one set of SL-RS resources/sets, a transmitting UE (e.g., UE 115a of FIG. 2) may be configured to send at least two types of SL-RSs within a PSSCH transmission. In addition to sending the two types of SL-RSs, the transmitting UE may further send an information that indicates the type. As described above, a first type of SL-RS may be associated with a first operational state of a reflective device 190 (e.g., the reflective device is active or "ON"). This indication may also instruct the receiving UE to prepare a particular type of CSI report (e.g., a "Type A" CSI Report for Reflective Device (RD) ON) for that SL-RS. A second type of first type of SL-RS may be associated with a second operational state of a reflective device 190 (e.g., the reflective device is inactive or "OFF"). This indication may also instruct the receiving UE to prepare a particular type of CSI report (e.g., a "Type B" CSI Report for Reflective Device (RD) OFF) for that SL-RS. In some examples, the Type B CSI report may be the same as the legacy CSI report described above with reference to FIG. 4.

Based on the foregoing, a transmitting UE may further be configured to request multiple CSI reports in a single PSSCH. That is, in either a first SCI (SCI-1) or a second SCI (SCI-2) in the PSSCH, the transmitting UE may request one CSI report based on an SL-RS configured for use with an active reflective device (e.g., a type A CSI report) and one CSI report based on an SL-RS for use with an inactive reflective device (e.g., a type B or legacy CSI report.

As will be explained in more detail below, for each type of SL-RS, there may be a corresponding CSI report that has its own report content. The transmitting UE may include CSI configuration information in an SCI of the PSSCH to indicate which type of CSI report to generate and send for each type of SL-RS. For example, a type A CSI report may include RSRP/RSRQ/SINR/CQI/RI and could have best index among a plurality of SL-RS resources, the worst index, etc. Additional details will be described below with reference to FIGS. 8-18.

In some examples, the SCI of the PSSCH may also include an indication of whether the reflective device is ON (e.g., is active or in the first operational state) or whether the reflective device is OFF (e.g., is inactive or in the second operational state). A receiving UE may use this indication of the operational state to determine the type of CSI report to generate and send back to the transmitting UE. In an example where a UE is configured with X number of SL-RSs within a slot (e.g., in a PSSCH), then an X-size bitmap is used in the SCI to indicate which SL-RSs correspond to an active reflective device 190), and another indication if the same CSI report is to be used across all SL-RSs where reflective device is ON or different reports are to be used for different SL-RSs.

Figure 5:
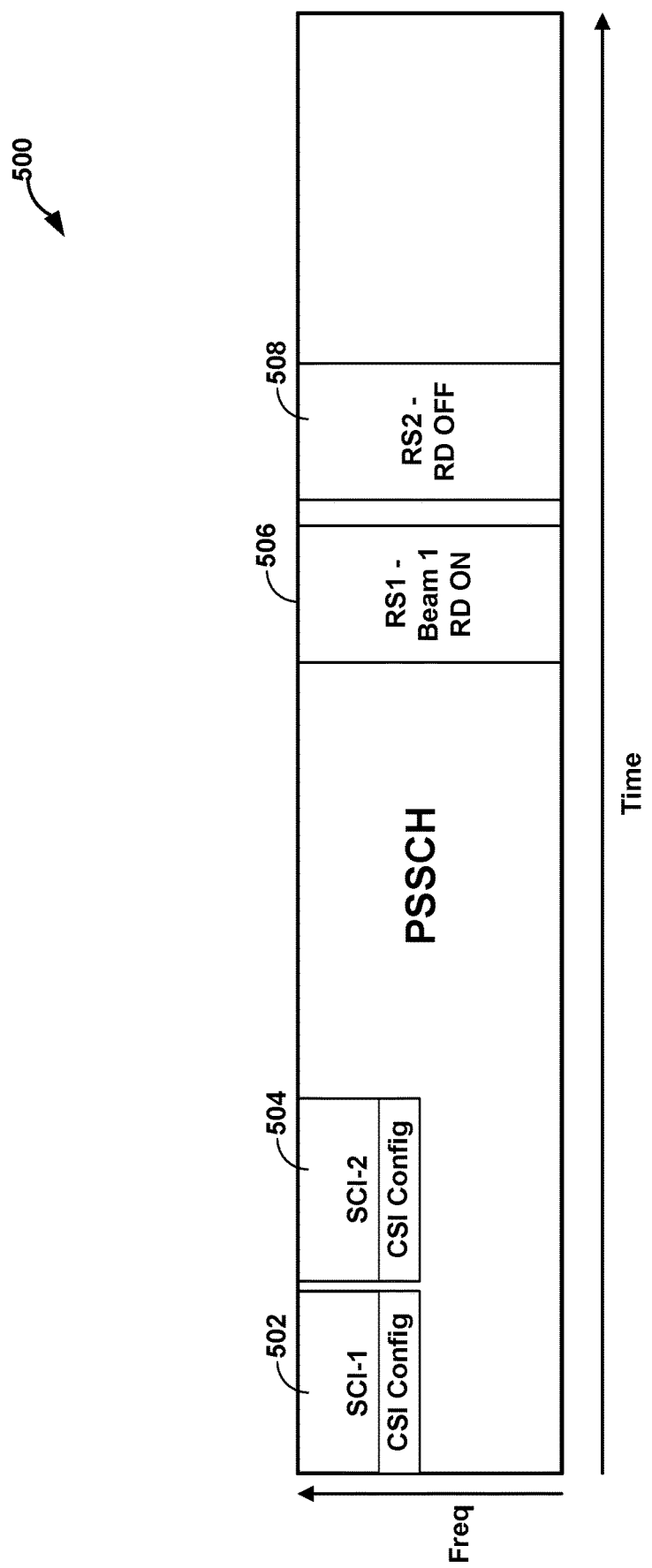
FIG. 5 illustrates an example signaling of SL-RSs in accordance with one or more aspects of the present disclosure.

FIG. 5 illustrates an example signaling of SL-RSs in accordance with one or more aspects of the present disclosure. FIG. 5 shows a PSSCH 500 that includes multiple types of SL-RSs. A transmitting UE 115*a* may send, to a receiving UE 115*b*, a plurality of SL-RS, wherein the transmitting UE and the receiving UE are configurable to communicate with a network entity (e.g., a reflective device). In this example, the plurality of SL-RSs includes a first SL-RS (e.g. RS1 506) corresponding to a first operational state of the network entity (e.g., reflective device (RD) being ON). The plurality of SL-RSs further includes a second SL-RS (e.g. RS2 508) corresponding to a second operational state of the network entity (e.g., RD OFF).

PSSCH 500 may further include SCI-1 502 and SCI-2 504. In some examples, each of SCI-502 and SCI-504 may include CSI report configuration information (CSI config). In other examples, only one of SCI-1 502 or SCI-2 504 may include the CSI report configuration information. As described above, the CSI report configuration information may define the SL-RSs being transmitted (e.g., RD ON or RD OFF) as well as the CSI report type that should be generated and sent by the receiving UE for each of the SL-RSs. SCI-1 502 and SCI-2 504 may also include a request for the receiving UE to generate CSI reports in accordance with the CSI report configuration information.

In some examples, the CSI report configuration information may include CSI report IDs. That is, the number and types of CSI reports to be generated and sent by the receiving UE may be based on a CSI report ID in the CSI report configuration information. In accordance with the techniques of this disclosure, at least two CSI report IDs may be used, though three or more CSI report types may be defined. The two CSI report types may correspond to the first operational state of the reflective device (e.g., RD ON) and the second operational state of the reflective device (e.g., RD OFF or Legacy). Each CSI report ID may be associated with a different CSI report type. If different beams (e.g., see FIG. 6) are used in the RD ON state (e.g., the RD is performing beam sweeping) then more report config IDs can be triggered since each beam will result in a different CSI report (e.g., RSRP/RSRQ/SINR/CQI).

As described above, the SCI-1 502 and/or SCI-2 504 may also include a request for the receiving UE to generate CSI reports in accordance with the CSI report configuration information. In one example, an expanded "CSI Request" field in SCI-1 502 (e.g., as defined in Release 16), or other reserve bits in the SCI-1 502, may be used to indicate whether the transmitting UE is requesting the receiving UE to generate a specific report type (e.g., a Type A RD ON report type or a Type B legacy report type). In other cases, SCI-2 504 can be used to indicate which type of report is to be generated and sent.

In view of the above, in a general example of the disclosure, a transmitting UE may send control information is indicative of a respective report type corresponding to each respective SL-RS of the plurality of SL-RSs. In one example, the respective report type corresponding to each respective SL-RS of the plurality of SL-RSs is one of a first report type or a second report type. In one example, the first report type is a non-legacy report type (e.g., a Type A RD ON report type) and the second report type is a legacy report type (e.g., a Type B RD OFF report type). In some examples, each CSI report of the one or more CSI reports generated by the receiving UE is based on one of the first report type or the second report type.

In some examples, the type of the CSI report can be part of an sl-CSI-Acquisition configuration or be indicated while configuring this feature. In addition, other aspects that could be indicated could include:

A differential CSI or individual CSI

How many bits used for each report and contents of the report (K best beams. L worst beams, comb), assuming different quantization or resolutions defined in spec and determined by signaling Single MAC-CE or multi-entry MAC-CE (at same time or multiple single entry-MAC-CE across defined times or sent with certain time gaps)

Details concerning single MAC-CE or multi-entry MAC-CE CSI reports will be described below with reference to FIGS. 8-18.

Figure 6:
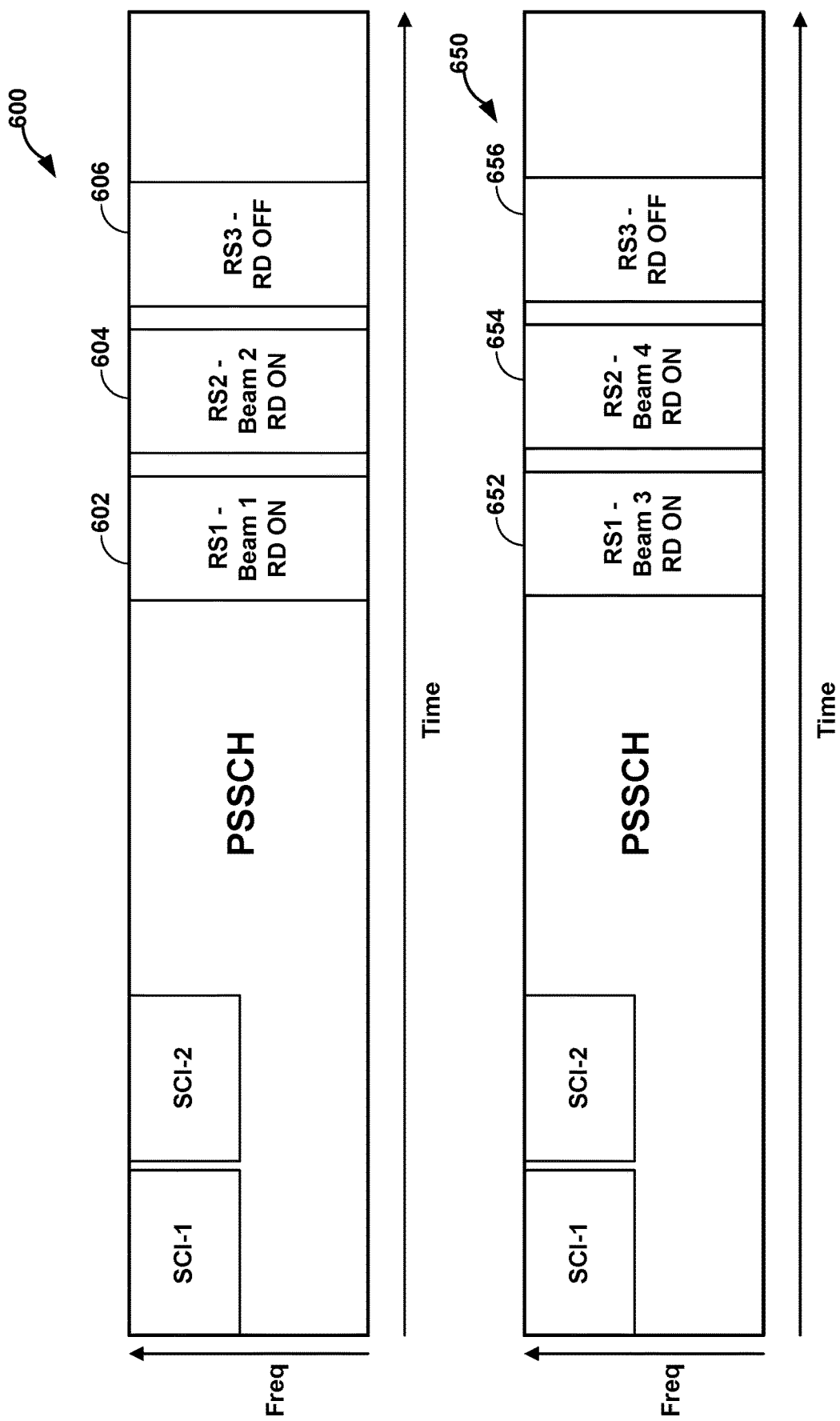
FIG. 6 illustrates another example signaling of SL-RSs in accordance with one or more aspects of the present disclosure.

FIG. 6 illustrates another example signaling of SL-RSs in accordance with one or more aspects of the present disclosure. As compared to PSSCH 500 of FIG. 5, FIG. 6 shows a PSSCH 600 that includes more than two SL-RSs. In one example, PSSCH 600 may include two SL-RSs 602 and 604 based on the reflective device being in the first operational state (e.g., RD ON). IN the example of PSSCH 600, SL-RSs 602 and 604 are sent at different times on two different beams (beam 1 and beam 2). In other examples, SL-RS 602 and 604 may be sent at different times on the same beam (e.g., both beam 1). That is, the same directionality may be used for both SL-RS 602 and 604. SL-RS 604 corresponds to the second operational state of the reflective device (e.g., RD OFF) and may generally correspond to SL-RS 508 of FIG. 5.

In some examples, the transmitting UE may be configured to send more than one PSSCH including additional SL-RSs. The receiving UE may receive the multiple SL-RSs from the multiple PSSCHs and generate corresponding CSI reports for all of the SL-RSs received. PSSCH 650 shows additional SL-RSs 652 and 654 that correspond to the RD ON operational state. As shown in FIG. 6, SL_RSs 652 and 654 may be send on additional different beams compared to SL-RSs 602 and 604. SL-RS 656 corresponds to the second operational state of the reflective device (e.g., RD OFF) and may generally correspond to SL-RS 508 of FIG. 5.

In a general example of the disclosure, a transmitting UE 115*a* may be configured to send, to a receiving UE 115*b* via a reflective device 190, each respective SL-RS of the plurality of SL-RSs that corresponds to the first operational state (e.g., SL-RSs 602, 604, 652, and 654. The transmitting UE 115*a* may be further configured to send, to the receiving UE 115*b* without use of the reflective device 190 (e.g., in sidelink directly), each respective SL-RS of the plurality of SL-RSs that corresponds to second first operational state (e.g., SL-RS 606 and 656).

Figure 7:
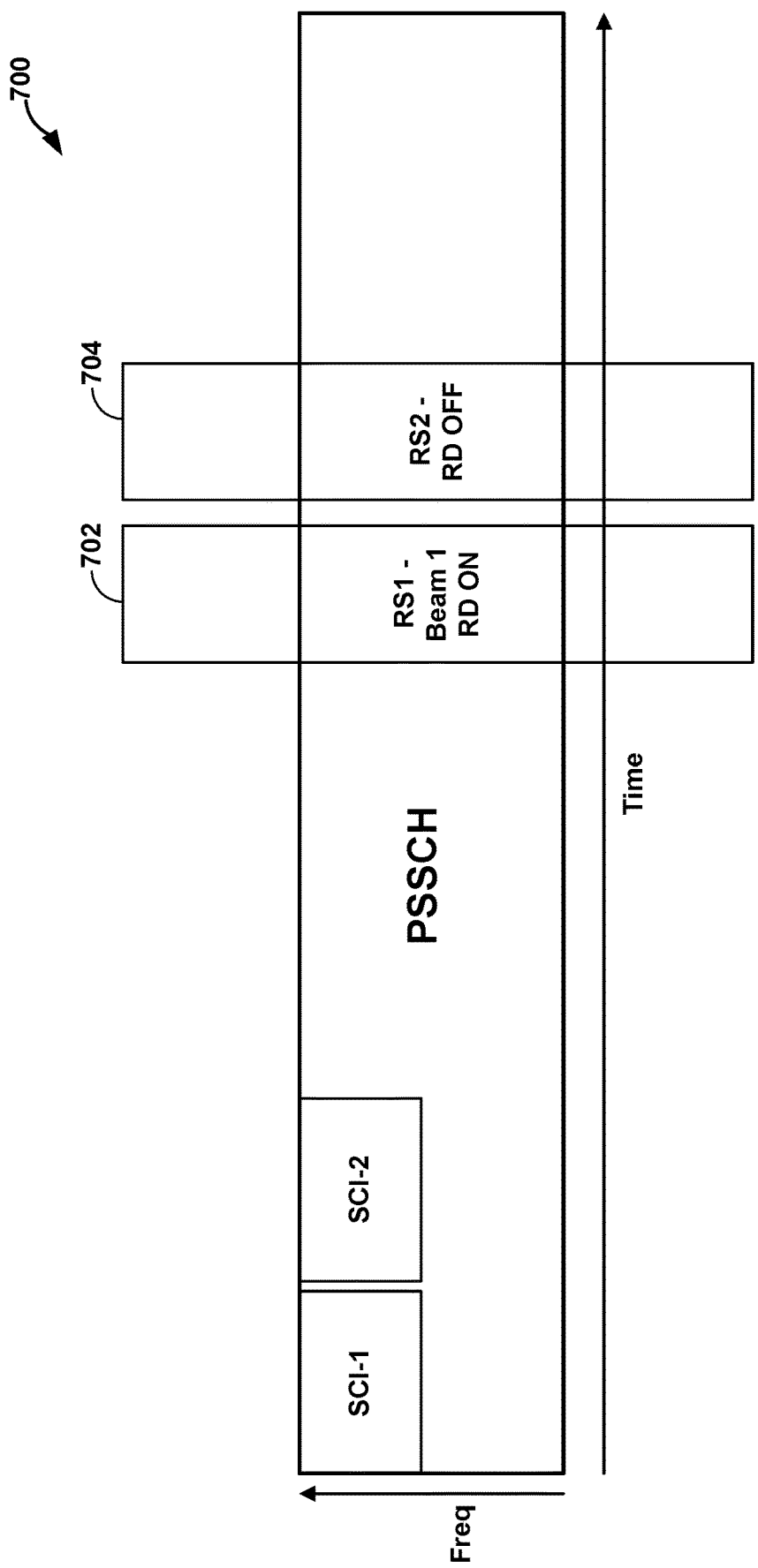
FIG. 7 illustrates another example signaling of SL-RSs in accordance with one or more aspects of the present disclosure.

FIG. 7 illustrates another example signaling of SL-RSs in accordance with one or more aspects of the present disclosure. In the example of FIG. 6 and FIG. 6, the bandwidth of the SL-RSs is the same as that of the PSSCH. However, this is not required. As shown in FIG. 7, the bandwidth of SL-RS 702 and 704 may be greater than (e.g., wider) than the bandwidth of PSSCH 700.

In another example of the disclosure, instead of sending a dedicated SL-RS for the second operational state of the reflective device 190 (e.g., the RD Off sate), and assuming the reflective device 190 is only reflecting during the transmission of an SL-RS, the receiving UE 115*b* may be configured to use a demodulation reference signal (DMRS) as the reference signal for the RD OFF CSI report type (e.g., Type B or Legacy Report. Alternatively, if a reflective device 190 is used to reflect DMRS and data with a beam, the receiving UE 115*b* may be informed using control information and is instructed to prepare the report as type A report (e.g., the RD ON CSI report).

As described above, in Release 16, CSI reports for SL-RSs are sent based on a latency requirement, e.g., as indicated by sl-LatencyBound-CSI-Report. If the latency requirement of the SL-CSI reporting in sl-LatencyBound-CSI-Report cannot be met, the receiving UE 115*b* may cancel the triggered CSI reporting. In this context, the latency requirement refers to the time in which the receiving UE 115*b* must generate and/or send the report to the transmitting UE 115*a*.

In one example of the disclosure, the latency requirement for SL-RS CSI reporting (e.g., as defined in sl-Latency-Bound-CSI-Report) can be defined per report. That is the Type A (RD ON) CSI reports may have different latency requirements than a Type B (e.g., Legacy or RD OFF) CSI report. In general, it may be preferable to allow for longer latency times for Type A reports, as the channel conditions when using a reflective device 190 may be less dynamic than two UEs communicating directly in sidelink.

In one example, a receiving UE 115*b* may be configured to operate according to a minimum CSI report time for each report type based on a capability of the receiving UE 115*b*. This may be beneficial since a Type A report may have different content relative to a legacy report, and the receiving UE 115*b* may need additional processing type to generate and send Type A (RD ON) CSI reports. As will be explained in more detail below, a Type A (RD ON) CSI report could contain a best beam index, a worst beam index, corresponding values for RSRP/RSRQ/CQI/RI, or a combination thereof.

The receiving UE 115*b* may be updated with different minimum CSI report times for the various types of SL-RSs described herein. The update may be based on Layer 1 (L1), Layer 2 (L2), and/or Layer 3 (L3) indications sent from the transmitting UE 115*a* to the receiving UE 115*b*. In other examples, the minimum CSI report times may be part of an RRC configuration (e.g., in an sl-CSI-Acquisition configuration) or another CSI configuration in PC5-RRC. In still other examples, the minimum CSI report times may be part of CSI-request in SCI-1, SCI-2, or combination thereof. The minimum CSI report times may also be configured through any other L1/L2/L3 indications or agreements The minimum CSI report times will define when exactly the transmitting UE 115*a* is expected to receive the MAC-CE of each CSI report from the receiving UE 115*b*, assuming that the same request instructs the generation and sending of both reports at the same time. In this case, the receiving UE 115*b* may send two time-separated MAC-CE CSI reports, or may send a multiple entry MAC-CE CSI report based at least on the minimum CSI report time.

FIGS. 8-18 show example designs for CSI reports for the multiple types of SL-RSs according to the techniques of this disclosure. In some examples, the CSI reports are sent in a MAC-CE. Some example options for generating CSI reports include:

Option A: Define a single entry MAC-CE for report type A (e.g., RD ON)

Option B: Define a multi-entry MAC-CE for report type A (e.g., send a portion of the CSI report on each MAC-CE entry). Based on number of beams, the entries expand. There may be as many as eight parts where each part could correspond to a beam Option C: Define a single entry sent on different MAC-CEs across time and separated with certain timing, e.g., each part is sent at least or at most T seconds from previous part FIG. 8 illustrates one example of a multi-entry CSI report 800 in accordance with one or more aspects of the present disclosure. In multi-entry CSI report 800, the report IDs 0-7 are single bit IDs that indicate if a particular MAC-CE CSI report entry is present. For example, a value of 1 for Report ID 0 indicates that a CSI report is present for the first row of the MAC-CE. A value of 0 for Report ID 0 would indicate that no CSI report is present for the first row of the MAC-CE. As shown in FIG. 8, MAC-CE CSI reports are present for Report ID 0, Report ID 1, and Report ID 7. Each of the report IDs may be related to a particular operational state of the reflective device 190 (e.g., RD ON or RD OFF).

Each of the rows of the multi-entry CSI report 800 may correspond to a different SL-RS. In the example of FIG. 8, each row of the multi-entry CSI report 800 may include an RI, a CQI, and a reference signal received power (RSRP) for an SL-RS. In some examples, for Type B legacy reports, the RSRP may not be present (e.g., see FIG. 4).

The RSRP is a measure of the power of the reference signal received by the receiving UE 115*b*. RSRP may be reported in dBm (decibel-milliwatts). RSRP may be used to estimate the quality of the received signal. In general, a higher RSRP value indicates a stronger signal and better signal quality, which can lead to improved data transfer rates and better network performance. As will be seen below, channel metrics other than RSRP (e.g., RSRQ. SINR, and others) may be used in the last three (3) bits of each row of the CSI report.

Accordingly, in one example of the disclosure, a multi-entry CSI report may include an RI indicative of antenna performance, a CQI for one or more SL-RSs of the plurality of SL-RSs corresponding to a first or second operational state of the reflective device (RD ON or OFF), and an RSRP for one or more SL-RSs of the plurality of SL-RSs corresponding to the first operational state of the reflective device (RD ON).

Figure 9:
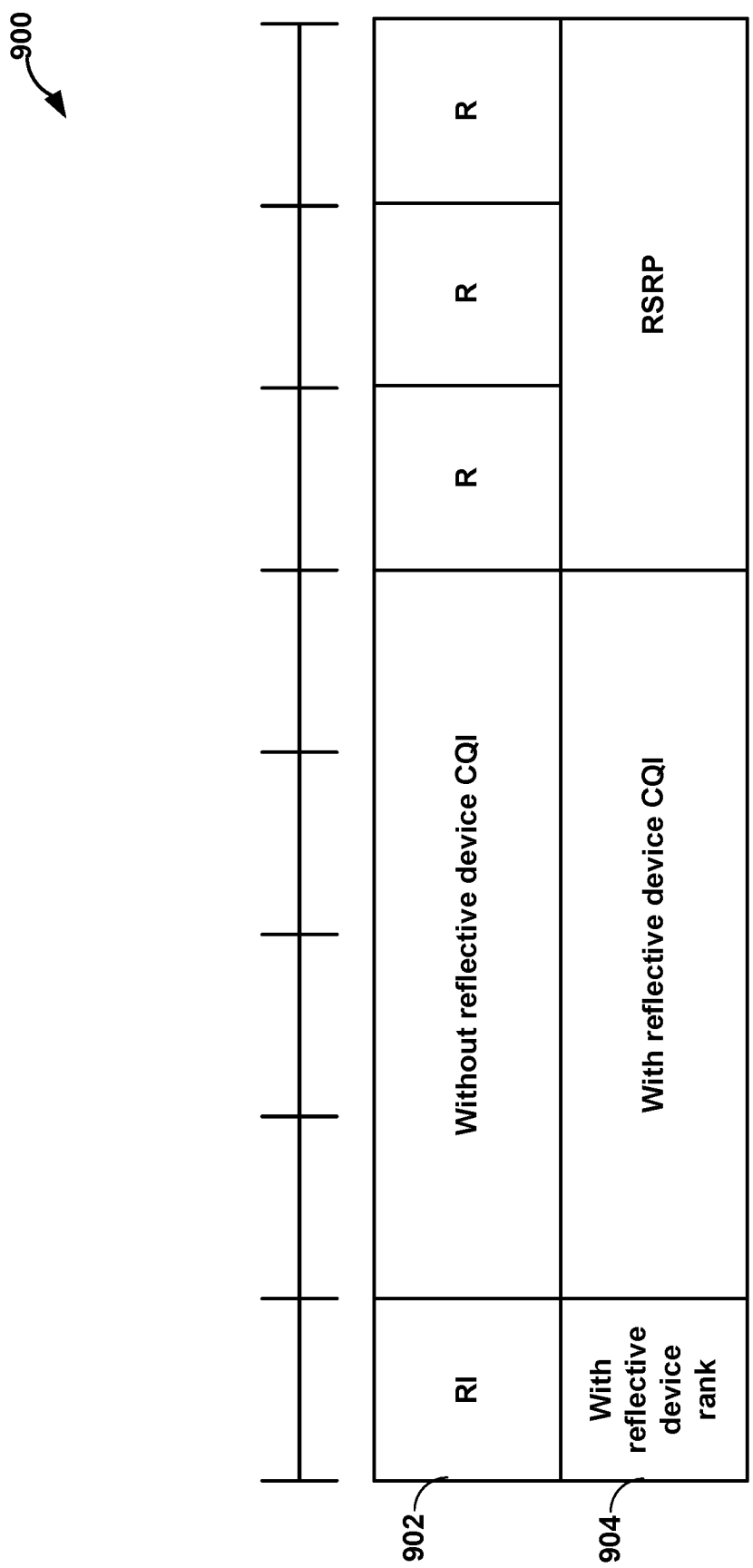
FIG. 9 illustrates another example of a multi-entry CSI report in accordance with one or more aspects of the present disclosure.

FIG. 9 illustrates another example of a multi-entry CSI report 900 in accordance with one or more aspects of the present disclosure. Multi-entry CSI report 900 may include a first report 902 for report Type B (RD OFF or Legacy) and a second report 904 for report Type A (RD ON). In other examples, the order of the reports may be switched. First report 900 may equivalent to the example in FIG. 4. Second report 904 may include an RI for the situation where the reflective device 190 is active (i.e., the "with reflective device rank"). Second report 904 may further include a CQI for an SL-RS where the reflective device 190 is active (i.e., the "with reflective device CQI"). Second report 904 may further include an RSRP in the last 3 bits of the row (e.g., the 3 bits corresponding to the reserved bits R of the legacy example of FIG. 4).

Figure 10:
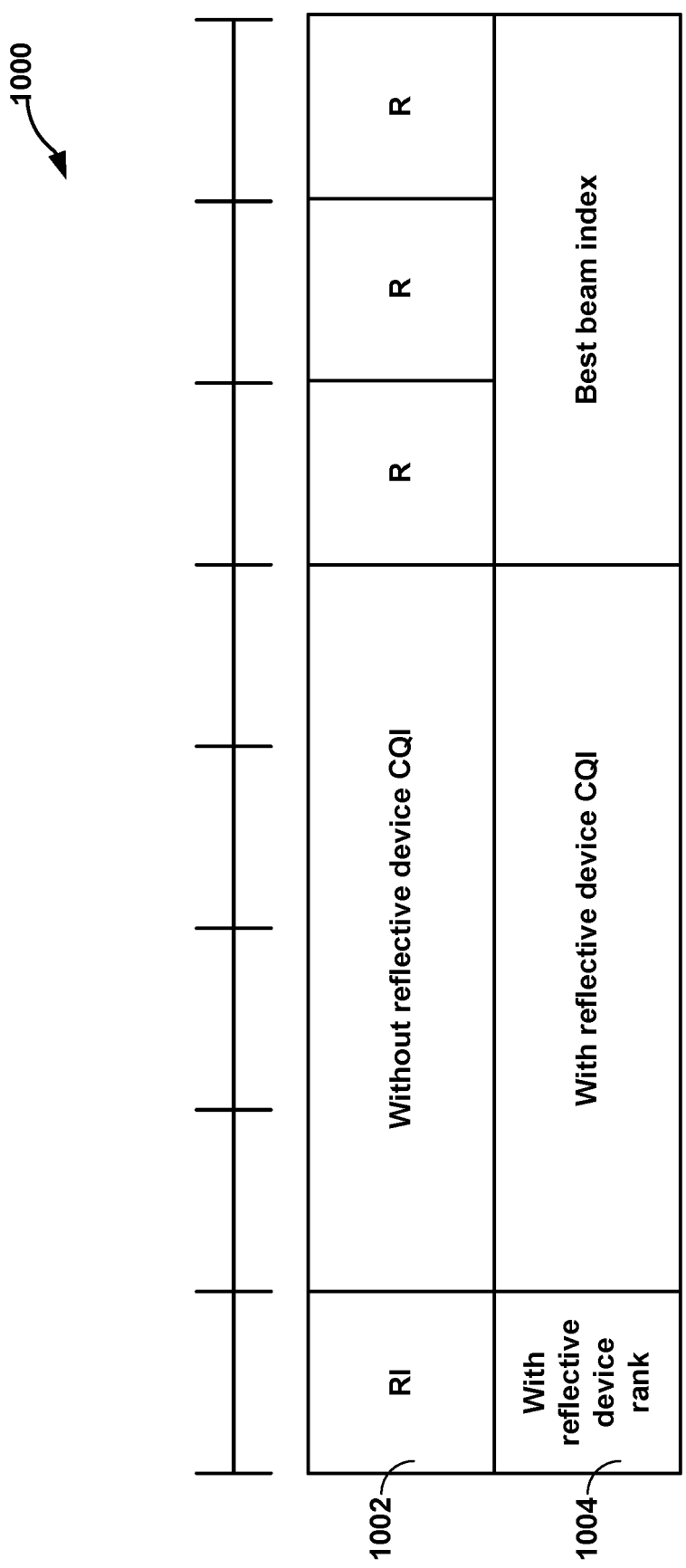
FIG. 10 illustrates another example of a multi-entry CSI report in accordance with one or more aspects of the present disclosure.

FIG. 10 illustrates another example of a multi-entry CSI report 1000 in accordance with one or more aspects of the present disclosure. Multi-entry CSI report 1000 may include a first report 1002 for report Type B (RD OFF or Legacy) and a second report 1004 for report Type A (RD ON). In other examples, the order of the reports may be switched. First report 1002 may equivalent to the example in FIG. 4. Second report 1004 may include an RI for the situation where the reflective device 190 is active (i.e., the "with reflective device rank"). Second report 1004 may further include a CQI for an SL-RS where the reflective device 190 is active (i.e., the "with reflective device CQI"). Second report 1004 may further include a best beam index in the last 3 bits of the row. That is, the receiving UE 115b may use the reserved bits of the CSI report to send the best beam index (e.g., assuming max of 8 beams). In one example, the best beam index is the index of the beam that provides the highest received signal quality at the receiver (e.g., in terms of RSRP, RSRQ. SINR or other metric).

Accordingly in another example of the disclosure, a multi CSI-report may include an RI, a CQI for one or more SL-RSs of the plurality of SL-RSs corresponding to the first operational state of the reflective device, and a best beam index for one or more SL-RSs of the plurality of SL-RSs corresponding to the first operational state of the reflective device.

Figure 11:
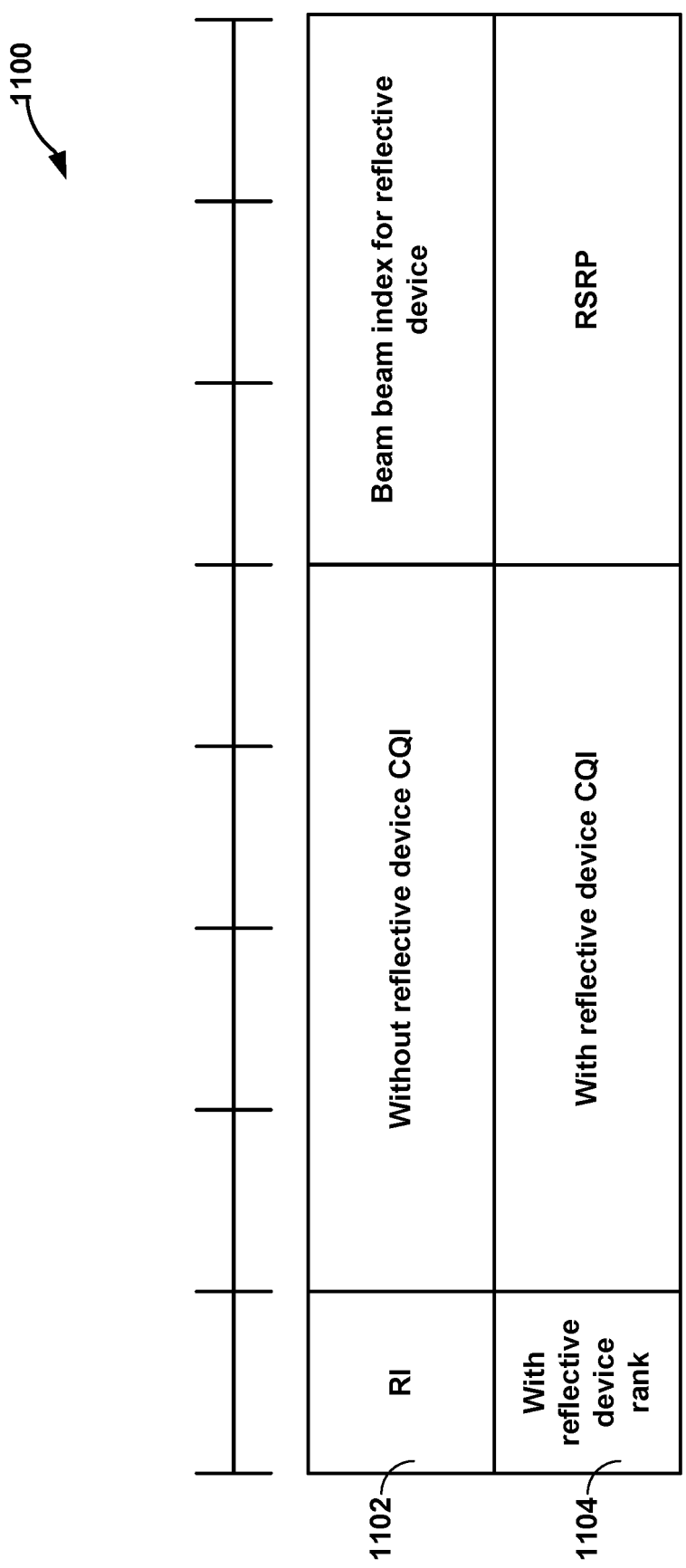
FIG. 11 illustrates another example of a multi-entry CSI report in accordance with one or more aspects of the present disclosure.

FIG. 11 illustrates another example of a multi-entry CSI report 1100 in accordance with one or more aspects of the present disclosure. Multi-entry CSI report 1100 may include a first report 1102 for report Type B (RD OFF or Legacy) and a second report 1104 for report Type A (RD ON). In other examples, the order of the reports may be switched. First report 1102 may equivalent to the example in FIG. 4, except that a best beam index (e.g., as described above for FIG. 10) for SL-RSs associated with the reflective device being active (RD ON) is included in the last 3 bits. Second report 1104 may include an RI for the situation where the reflective device 190 is active (i.e., the "with reflective device rank"). Second report 1104 may further include a CQI for an SL-RS where the reflective device 190 is active (i.e., the "with reflective device CQI"). Second report 1104 may further include an RSRP in the last 3 bits of the row (e.g., the 3 bits corresponding to the reserved bits R of the legacy example of FIG. 4).

Note that the channel metrics described above (e.g., CQI, RSRP. RI, Best Beam Index, etc.) are just examples and that any type of channel metric may be used in the reports depicted.

In other examples, rather than sending multi-entry CSI reports that may include multiple entries with channel metrics for both types of SL-RSs (e.g., RD ON and RD OFF), the receiving UE 115b may be configured to generate and send a single-entry CSI report that includes channel metrics for a single SL-RS.

In one example, a CSI report may include multiple types of channel metrics where the number of bits assigned to each channel metric may be configurable. As one example, the index of the best beam may be assigned as X number of bits. Then, another channel metric (e.g., RSRP, RSRQ. SINR, etc.) may be assigned as 8-X bits (e.g., assuming an 8-bit MAC-CE). The value of X may be configured by any of one RRC, MAC-CE, SCI, and/or downlink control information (DCI) signaling. Note that the use of DCI assumes that a network entity 105 (e.g., a gNB) is involved in configuring the sidelink CSI reports.

In other cases, the RSRP (or other channel metric) resolution can increase or other channel metrics can be added to the CSI report (e.g., RI and/or CQI). Other examples may include the index of a beam, the index of 2 or more best beams, as well as corresponding RSRP or CQI values.

Figure 12:
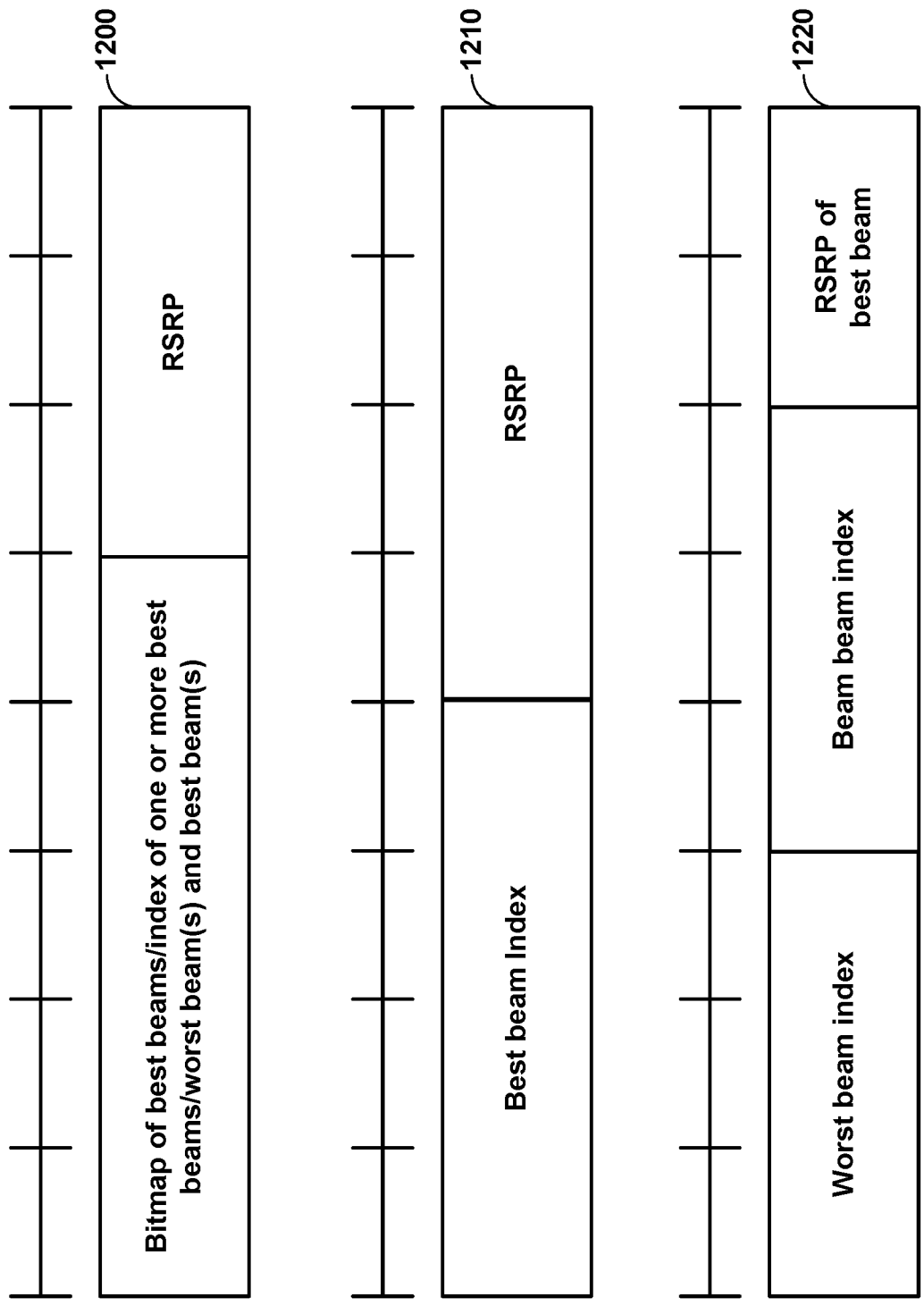
FIG. 12 illustrates one example of a single-entry CSI report in accordance with one or more aspects of the present disclosure.

FIG. 12 illustrates examples of single-entry CSI report 1200 in accordance with one or more aspects of the present disclosure. Single-entry CSI report 1200 is configured to report a bitmap of best beams/indexes of one or more best beams. In other examples, the bitmap may be beam indexes of one or more best beams and one pr more worst beams. The remaining bits of single-entry CSI report 1200 includes an RSRP value. IN this example, the bitmap of beam indices in 5 bits long, while the RSRP is 3 bits long. However, as described above, the number of bits for each channel metric is configurable.

Single-entry CSI report 1210 comprises a 4-bit best beam index and a 4-bit RSRP. Single-entry CSI report 1220 includes a 3-bit worst beam index, a 3 bit best beam index, and a 2-bit RSRP of the best beam. Again, these are just examples of bit-lengths and channel metrics. Other bit lengths and channel metrics may be used.

Figure 13:
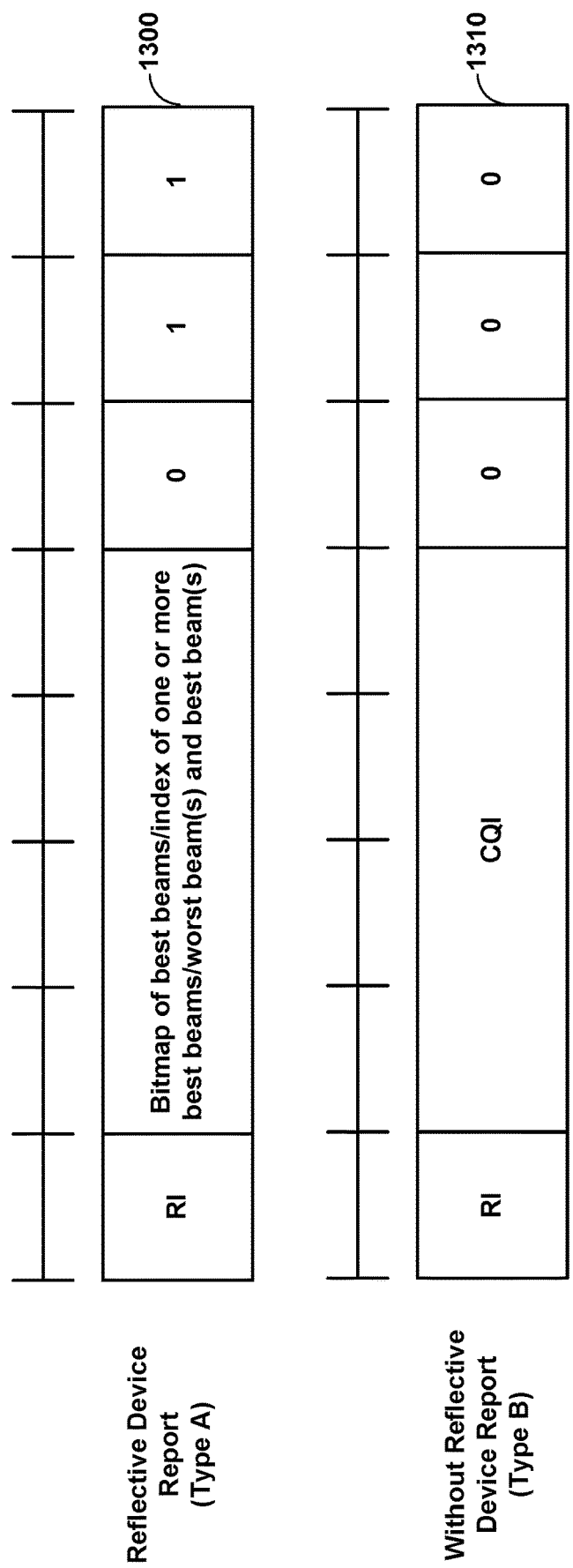
FIG. 13 illustrates another example of a single-entry CSI report in accordance with one or more aspects of the present disclosure.

In other examples, a single-entry CSI report may correspond to a particular CSI report type (e.g., Type A RD ON, or Type B Legacy). The Reserved (R) bits (see FIG. 4) may be used to indicate the report type. FIG. 13 illustrates another example of a single-entry CSI report in accordance with one or more aspects of the present disclosure. CSI report 1300 is a Type A report type for use with a reflective device being active (e.g., RD). CSI report includes an RI and a bitmap of beam indices (e.g., see CSI report 1200 of FIG. 12). The reserved bit sequence of 011 (or another sequence) may be used to indicate report type A. Again, the channel metrics shown in CSI report 1300 is just one example, and other channel metrics may be used. CSI report 1310 is a Type B legacy report (e.g., without reflective device being active) and is the same as that shown in FIG. 4. However, in this context, the reserved bits sequence of 000 explicitly indicates that a Type B report is being sent.

Figure 14:
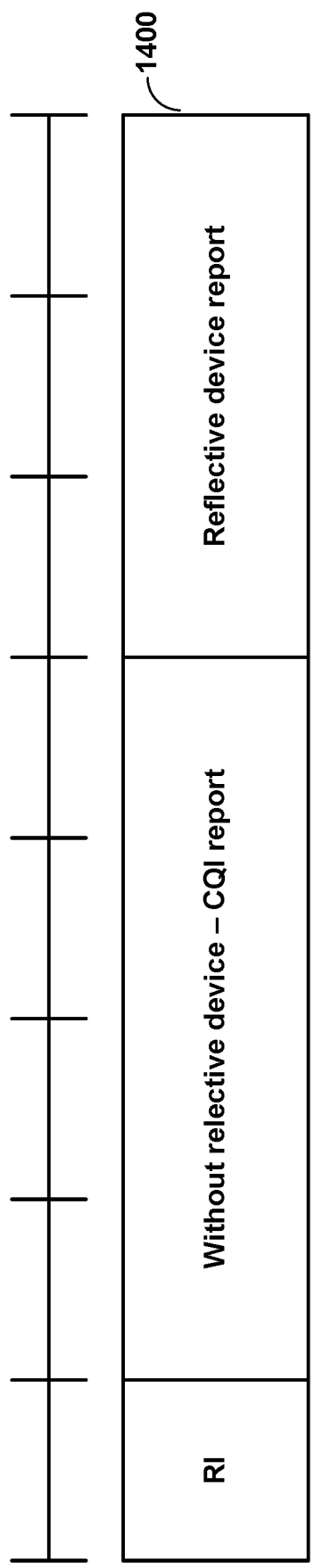
FIG. 14 illustrates another example of a single-entry CSI report in accordance with one or more aspects of the present disclosure.

FIG. 14 illustrates another example of a single-entry CSI 1400 report in accordance with one or more aspects of the present disclosure. In this example, CSI report 1400 includes an RI, a CQI for the SL-RS based on the reflective device being inactive (e.g., without reflective device or RD OFF), as well as some other channel metric (reflective device report) corresponding to the SL-RS based on the reflective device being active. In effect, a single CSI report is sent that uses the reserved bits of the CSI report of FIG. 4 to provide channel metric information for the SL-RS related to the reflective device being active. The channel metric information may partially or full send the channel metric. Example channel metrics may include a best beam index, an RSPR of a single beam, or other channel metric. This example gives the beam index resolution of 3 bits (e.g., 8 beams) while 4 bits for type B legacy CSI report. In other examples, other bit configurations may be used.

Figure 15:
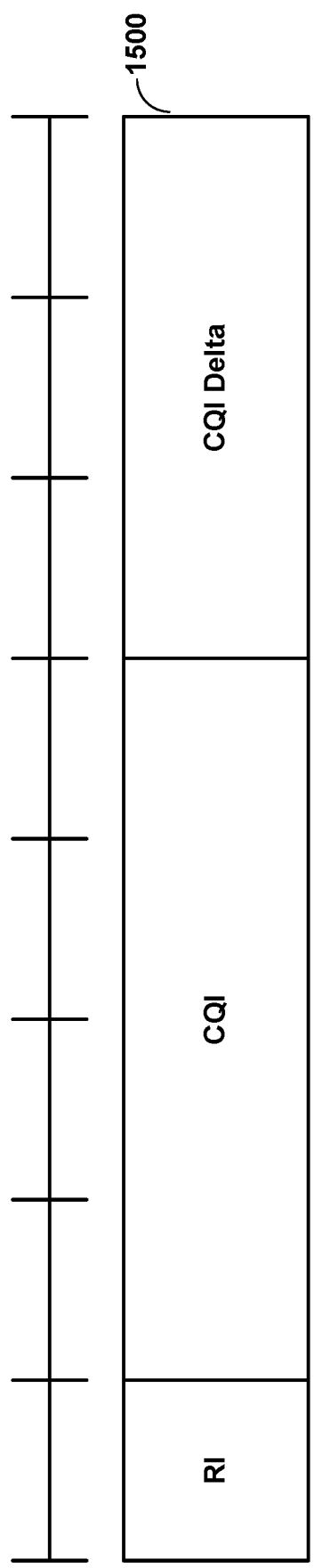
FIG. 15 illustrates another example of a single-entry CSI report in accordance with one or more aspects of the present disclosure.

FIG. 15 illustrates another example of a single-entry CSI report 1500 in accordance with one or more aspects of the present disclosure. CSI report 1500 allows for the sending of two CSI reports (e.g., a Type A and Type B CSI report) in a single entry by leveraging the reserved bits partially or fully to send the delta CQI for the best one or more beams. The delta CQI may be defined as the CQI for a beam of an SL-RS that uses a reflective device (RD ON) subtracted by a CQI for a beam of an SL-RS that does not use a reflective device (RD OFF). The delta CQI may be computed for each beam or for the best beam. As seen in FIG. 15, an RI is sent followed by 4 bits for the legacy CQI (e.g., the CQI for an RD OFF SL-RS). The last 3 bits are used for the CQI delta. In some examples, the value of the CQI delta is quantized. The quantization procedure and levels can predefined, or provided in RRC/MAC-CE signals. A UE may be preconfigured with multiple procedures for quantization and one of them is signaled in RRC/MAC-CE or SCI.

Figure 16:
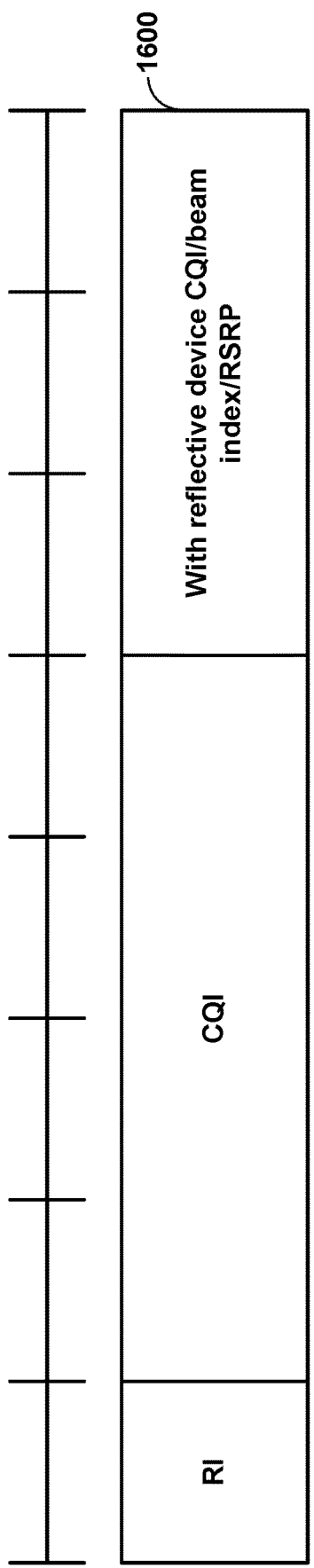
FIG. 16 illustrates another example of a single-entry CSI report in accordance with one or more aspects of the present disclosure.

FIG. 16 illustrates another example of a single-entry CSI report 1600 in accordance with one or more aspects of the present disclosure. A transmitting UE 115a, based on configuration in RRC/MAC-CE, may use signaling in the SCI of a PSSCH to change the resolution of each report type. In the example of FIG. 16, 7 bits are available after the RI. The transmitting UE 115a may request the receiving UE 115b to use X number of bits for the channel metric for the Type A report (e.g., RD ON) and 7-X bits for a CQI for the type B report (e.g., Legacy or RD OFF). The channel metric used for the type A report may be any of the metrics discussed above, including CQI, RSRP, beam index, and the like.

In other examples, a transmitting UE 115a may select 4+y bits, where y could be {1, 2, 3, to define the max CSI bits. The transmitting UE 115a may then assign that 4+y bits to use various channel metrics for both SL-RSs for RD ON and SL-RSs for RD OFF. The determination for the 4+y bits may be based on resource pool configuration done by a network entity 105 (e.g., a gNB) and may be dynamically changed by a network entity or other UEs.

Figure 17:
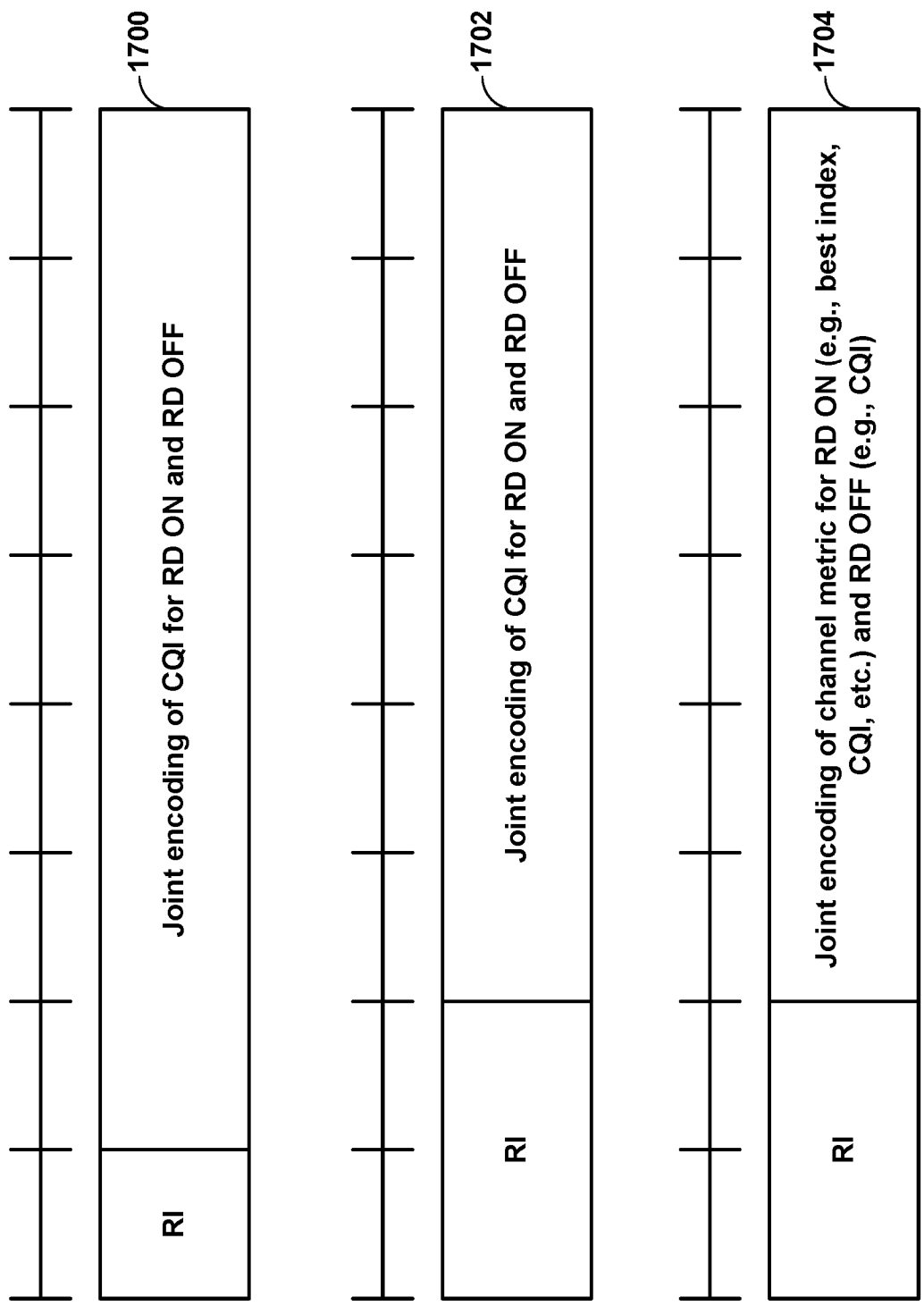
FIG. 17 illustrates another example of a single-entry CSI report in accordance with one or more aspects of the present disclosure.

FIG. 17 illustrates another example of a single-entry CSI report in accordance with one or more aspects of the present disclosure. FIG. 17 shows CSI reports 1700, 1702, and 1704. In each of these reports a 1-bit RI (report 1700) or a 2-bit RI (reports 1702 and 1704) are followed by a joint encoding of channel metrics for both SL-RSs for RD ON and SL-RSs for RD OFF. The joint encoding may be an index to a table that indicates predefined values or ranges of values for channel metrics for an SL-RS for RD ON (e.g., a Type A report) and channel metrics for an SL-RS for RD OFF (e.g., a Type B or legacy report). The joint encoding for the two types of SL-RSs may indicate an index to a table where the channel metrics are the same for each type of SL-RS, or may be an index to a table where the channel metrics are different for each type of SL-RS.

CSI report 1700 is an example of a report with a 1-bit RI followed by a 7-bit joint encoding of CQIs for RD ON and RD OFF. CSI report 1702 is an example of a report with a 2-bit RI followed by a 6-bit joint encoding of CQIs for RD ON and RD OFF. CSI report 1704 is an example of a report with ha 1-bit RI followed by a 7-bit joint encoding a channel metric for RD ON with another channel metric for RD OFF (e.g., CQI). The number of bits, as well as the metrics that are jointly encoded may be configurable. Again, the joint encoding may be implemented as an index to a table of channel metrics.

FIG. 18 illustrates an example of joint encoding for a single-entry CSI report in accordance with one or more aspects of the present disclosure. FIG. 18 shows an example table 1800 for a 2-bit joint encoding. Of course, examples with a larger number of bits for joint encoding would result in larger tables. Table 1800 shows an example of a joint encoding of a CQI for RD ON and RD OFF. In this example the CQI values are given as ranges. For example, a joint encoding value of 00 indicates that the CQI for the SL-RS associated with RD OFF (e.g., the reflective device is inactive) is less than 10, while the CQI for the SL-RS associated with RD ON (e.g., the reflective device is active) is between 10 and 12. A joint encoding value of 01 indicates that the CQI for the SL-RS associated with RD OFF is between 10 and 14, while the CQI for the SL-RS associated with RD ON is less than 10. A joint encoding value of 10 indicates that the CQI for the SL-RS associated with RD OFF is between 15 and 20, while the CQI for the SL-RS associated with RD ON is less than 10. A joint encoding value of 11 indicates that the CQI for the SL-RS associated with RD OFF is less than 10, while the CQI for the SL-RS associated with RD ON is between 14 and 20.

Again, table 1800 of FIG. 18 is just an example. Different numbers of bits, combinations of metrics, range of values for the metrics, and SL-RS types may be used in other examples.

Figure 19:
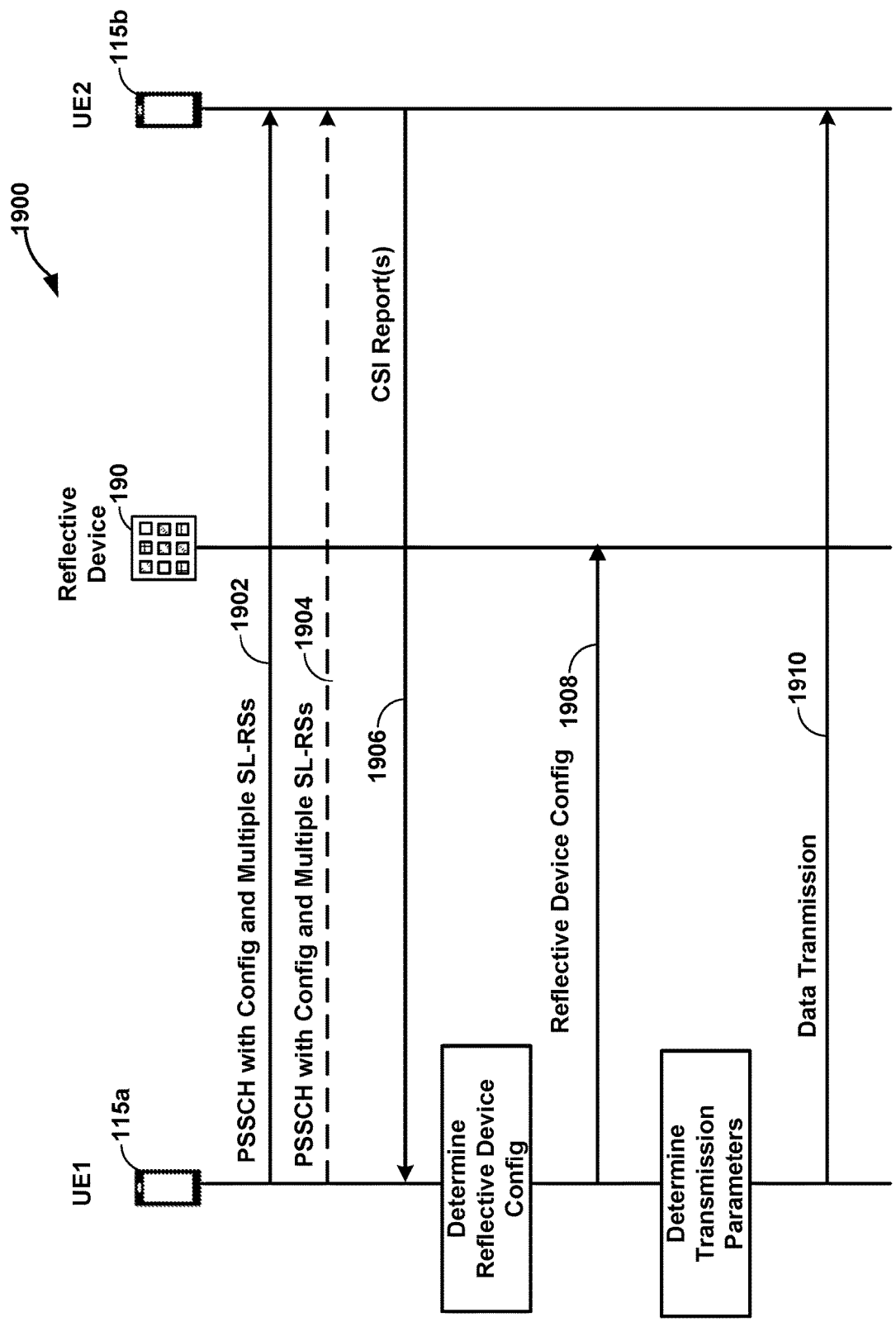
FIG. 19 illustrates an example call flow diagram report in accordance with one or more aspects of the present disclosure.

FIG. 19 illustrates an example call flow diagram report in accordance with one or more aspects of the present disclosure. FIG. 19 shows a process 1900 in accordance with the techniques of this disclosure. A transmitting UE 115a may send a PSSCH 1902 to receiving UE 115b. The PSSCH 1902 may include CSI report configuration information (config) as well as multiple SL-RSs. As described above, the multiple SL-RSs may include a first SL-RS corresponding to a first operational state of the reflective device 190 (e.g., active or RD ON), as well as a second SL-RS corresponding to a second operational state of the reflective device 190 (e.g., inactive or RD OFF). Depending on the operational state of the reflective device 190, the PSSCH 1902 may either be sent directly to the receiving UE 115b or may be sent to the receiving UE 115b through reflective device 190. Though not required, in some examples, the transmitting UE 115a may send one or more additional PSSCHs 1904 that include additional SL-RSs.

Based on the CSI reporting configuration information and the types of SL-RSs, received, the receiving UE 115b may generate one or more CSI reports 1906 and send the CSI reports 1906 back to the transmitting UE 115a. The receiving UE 115b may generate the CSI reports 1906 using any combination of the techniques described above. Again, the CSI reports 1906 may be sent back to the transmitting UE 115a either directly or through the reflective device 190 depending on the operational status of the reflective device.

Based on the CSI reports 1906, the transmitting UE 115a may determine a reflective device configuration (config) 1908 for the reflective device 190. That is, the transmitting UE 115a may use the CSI reports 1906 as part of the beam training process for reflective device 190 described above.

In addition, the transmitting UE 115a may determine transmission parameters for subsequent data transmissions 1910 to the UE 115b based on the CSI reports. The transmission parameters may include modulation and coding schemes (MCS), transmit power, beamforming, symbol duration, subcarrier spacing, among other transmission parameters.

Figure 20:
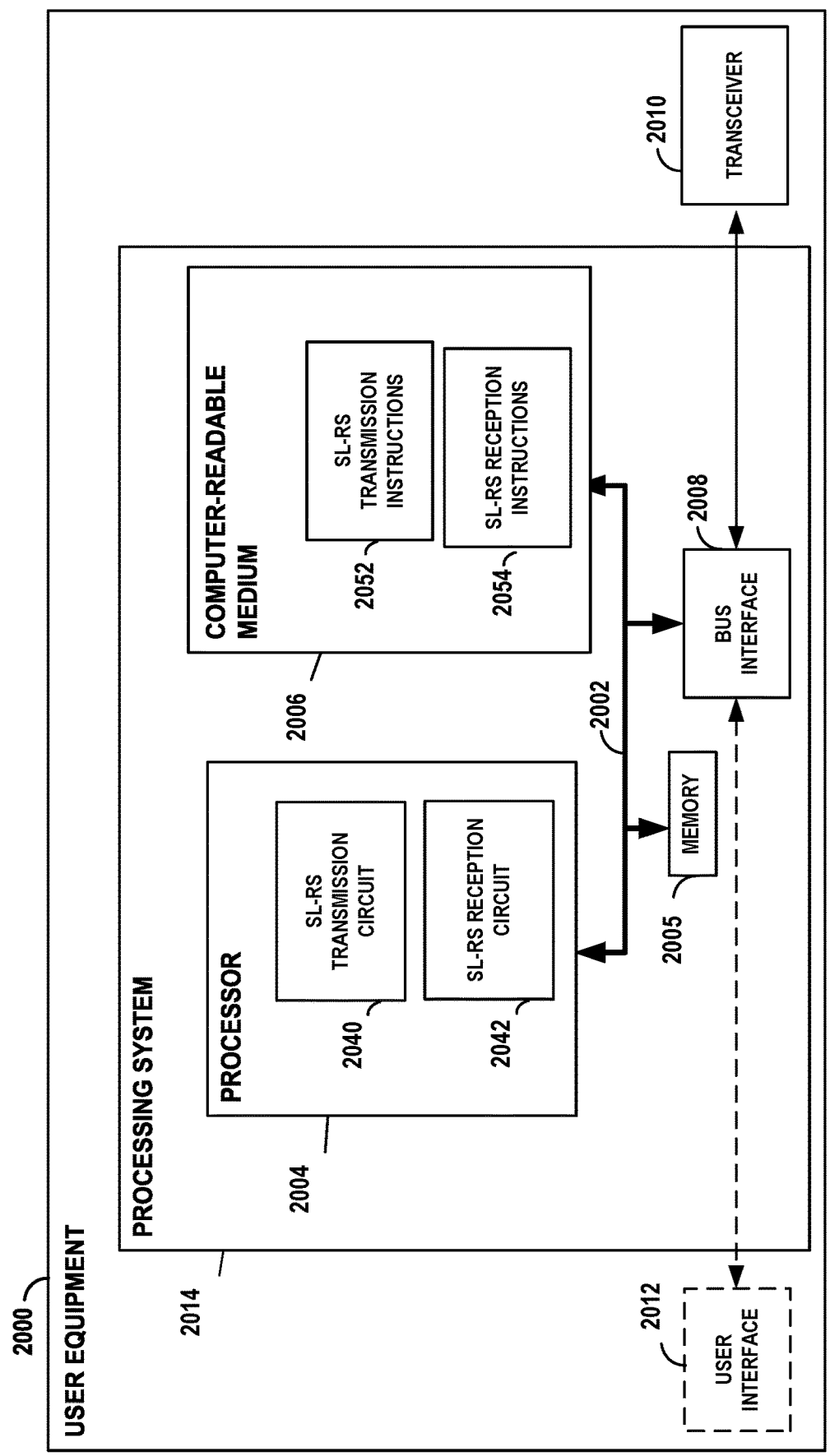
FIG. 20 is a block diagram illustrating an example of a hardware implementation for a UE in accordance with one or more aspects of the present disclosure.

FIG. 20 is a block diagram illustrating an example of a hardware implementation for a UE in accordance with one or more aspects of the present disclosure. FIG. 20 shows the hardware implementation for a UE 2000 that may operate as either a transmitting UE (e.g., UE 115a of FIG. 19) or a receiving UE (e.g., UE 115b of FIG. 19). That is UE 2000 may be configured to both send SL-RSs in accordance with the techniques of this disclosure as well as receive SL-RSs and generate corresponding CSI reports in accordance with the techniques of this disclosure.

The UE 2000 may include a processing system 2014 having one or more processors 2004. Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2000 may be configured to perform any one or more of the functions described herein. For example, the processor 2004, as utilized in a UE 2000, may be configured (e.g., in coordination with the memory 2005) to implement any one or more of the processes and procedures for SL-RSs transmission and reception for use with a reflective device as described herein.

The processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits including one or more processors (represented generally by the processor 2004), a memory 2005, and computer-readable media (represented generally by the computer-readable medium 2006). The bus 2002 may also link various other circuits such as timing sources, peripherals, voltage regulators, and power management circuits, which are well known in the art, and therefore, will not be described any further. A bus interface 2008 provides an interface between the bus 2002 and a transceiver 2010. The transceiver 2010 provides a communication interface or means for communicating with various other apparatus over a transmission medium. Depending upon the nature of the apparatus, a user interface 2012 (e.g., keypad, display, speaker, microphone, joystick) may also be provided. Of course, such a user interface 2012 is optional, and some examples, such as a base station, may omit it.

In some aspects of the disclosure, the processor 2004 may include an SL-RS transmission circuit 2040 configured (e.g., in coordination with the memory 2005) for various functions, including, e.g., sending, to a second UE (e.g., UE 115*b* of FIG. 19), a plurality of SL-RSs, wherein UE 2000 and the second UE are configurable to communicate with a network entity (e.g., a reflective device 190), and wherein the plurality of SL-RSs includes a first SL-RS corresponding to a first operational state of the network entity. More details describing the techniques that may be performed by the SL-RS transmission circuit 2040 are described above and below with reference to FIG. 21.

Processors 2004 may further include an SL-RS reception circuit 2042 configured to receive, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity. The SL-RS reception circuit 2042 may further be configured to generate one or more channel state information (CSI) reports, wherein each CSI report of the one or more CSI reports corresponds to a respective SL-RS of the plurality of SL-RSs, and send, to the second UE, the one or more CSI reports. More details describing the techniques that may be performed by the SL-RS reception circuit 2042 are described above and below with reference to FIG. 22.

The processor 2004 is responsible for managing the bus 2002 and general processing, including the execution of software stored on the computer-readable medium 2006. The software, when executed by the processor 2004, causes the processing system 2014 to perform the various functions described above for any particular apparatus. The processor 2004 may also use the computer-readable medium 2006 and the memory 2005 for storing data that the processor 2004 manipulates when executing software.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006. The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2006 may reside in the processing system 2014, external to the processing system 2014, or distributed across multiple entities including the processing system 2014. The computer-readable medium 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 2006 may store computer-executable code that includes SL-RS transmission instructions 2052 configured for various functions, including, e.g., sending, to a second UE (e.g., UE 115*b* of FIG. 19), a plurality of SL-RSs, wherein UE 2000 and the second UE are configurable to communicate with a network entity (e.g., a reflective device 190), and wherein the plurality of SL-RSs includes a first SL-RS corresponding to a first operational state of the network entity. More details describing the techniques that may be performed by the SL-RS transmission instructions 2052 are described above and below with reference to FIG. 21.

Computer-readable storage medium 2006 may further store SL-RS reception instructions 2054 configured to receive, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity. The SL-RS reception instructions 2054 may further be configured to generate one or more channel state information (CSI) reports, wherein each CSI report of the one or more CSI reports corresponds to a respective SL-RS of the plurality of SL-RSs, and send, to the second UE, the one or more CSI reports. More details describing the techniques that may be performed by the SL-RS reception instructions 2054 are described above and below with reference to FIG. 22.

In one configuration, an apparatus for wireless communication means for sending, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity, means for receiving, from the second UE, one or more channel state information (CSI) reports, wherein each CSI report of the one or more CSI reports corresponds to a respective SL-RS of the plurality of SL-RSs, and means for sending information based on one or more CSI reports of the one or more CSI reports. In one aspect, the aforementioned means may be the processor 2004, including SL-RS transmission circuit 2040, configured to perform the functions recited by the aforementioned means. In another aspect, the aforementioned means may be a circuit or any apparatus configured to perform the functions recited by the aforementioned means.

In another configuration, an apparatus for wireless communication means for receiving, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity, means for generating, one or more channel state information (CSI) reports, wherein each CSI report of the one or more CSI reports corresponds to a respective SL-RS of the plurality of SL-RSs, and means for sending, to the second UE, the one or more CSI reports. In one aspect, the aforementioned means may be the processor 2004, including SL-RS reception circuit 2042, configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. described herein, and utilizing, for example, the processes and/or algorithms described above and described below in relation to FIGS. 21 and/or 22.

Figure 21:
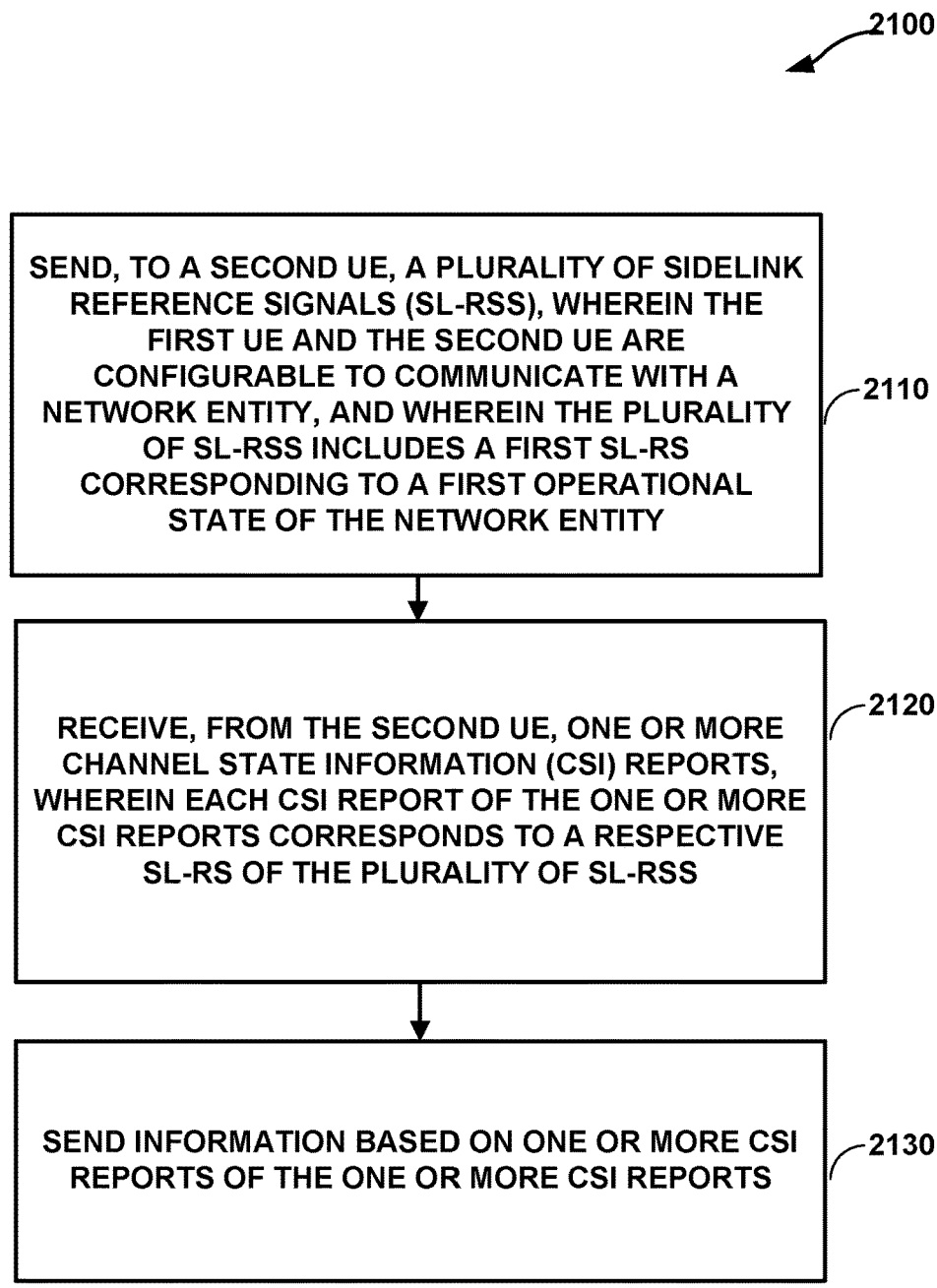
FIG. 21 is a flowchart illustrating an example of a process for transmitting SL-RSs according to some aspects of this disclosure.

FIG. 21 is a flowchart illustrating an example of a process for transmitting SL-RSs according to some aspects of this disclosure. The techniques of process 2100 may be performed by a UE 115 (e.g., UE 115*a* of FIG. 19) as described herein.

A first UE (e.g., UE115*a* of FIG. 19) may be configured to send, to a second UE (e.g., UE 115*b* of FIG. 19), a plurality of SL-RSs, wherein the first UE and the second UE are configurable to communicate with a network entity (e.g., a reflective device 190), and wherein the plurality of SL-RSs includes a first SL-RS corresponding to a first operational state of the network entity (2110). As described above, the network entity may be a reflective device 190, including one of a reconfigurable intelligent surface (RIS), a reflective surface, a backscattering-capable device, a radio frequency (RF) tag, a passive UE, a backscatter UE, or an ambient Internet-of-Things (IoT) device.

The plurality of SL-RSs sent by the first UE may further include a second SL-RS, wherein the second SL-RS corresponds to a second operational state of the network entity. In one example, the first operational state is an active state and the second operational state is an inactive state. In one example, the first UE is configured to send, to the second UE via the network entity, each respective SL-RS of the plurality of SL-RSs that corresponds to the first operational state, and send, to the second UE without use of the network entity, each respective SL-RS of the plurality of SL-RSs that corresponds to second first operational state.

In another example, the plurality of SL-RSs includes a third SL-RS corresponding to the first operational state of the network entity, and wherein, to send the plurality of SL-RSs, the first UE is configured to send a physical sidelink shared channel (PSSCH) transmission including the plurality of SL-RSs and control information. In one example, the control information is indicative of a respective operational state of the network entity corresponding to each respective SL-RS of the plurality of SL-RSs. In one example, the first UE may send the plurality of SL-RSs using a bandwidth that is wider than a PSSCH.

In another example, each SL-RS of the plurality of SL-RSs corresponds to the first operational state of the network entity, and the first UE is configured to send a demodulation reference signal (DMRS) corresponding to a second operational state of the network entity.

The first UE may also be configured to receive, from the second UE, one or more channel state information (CSI) reports, wherein each CSI report of the one or more CSI reports corresponds to a respective SL-RS of the plurality of SL-RSs (2120). In one example, the control information referenced above is CSI report configuration information. The control information may be indicative of a respective report type corresponding to each respective SL-RS of the plurality of SL-RSs.

In one example, the respective report type corresponding to each respective SL-RS of the plurality of SL-RSs is one of a first report type or a second report type. In one example, the first report type is a non-legacy report type and the second report type is a legacy report type. In some examples, each CSI report of the one or more CSI reports is based on one of the first report type or the second report type.

In another example, the CSI report configuration information includes a first CSI report type for a first CSI report corresponding to the first SL-RS and a second CSI report type for a second CSI report corresponding to a second SL-RS, wherein the second SL-RS corresponds to a second operational state of the network entity, and wherein the first CSI report type is different than the second CSI report type. In some examples, the CSI report configuration information includes information indicative of one or more of a latency corresponding to CSI reporting or a minimum CSI reporting time. The first UE may be configured to send the CSI report configuration information in sidelink control information (SCI).

In some examples, the first UE may be configured to receive the one or more CSI reports in a single media access control-control element (MAC-CE). In other examples, the first UE may be configured to receive the one or more CSI reports in a multiple-entry MAC-CE. Details of the types of reports were described above with reference to FIGS. 8-18.

The first UE may be further configured to send information based on one or more CSI reports of the one or more CSI reports (2130). Sending information based on the one or more CSI reports may include sending information relating to training a reflective device 190 and/or determining transmission parameters (e.g., beams, precoding matrices, Etc.) for sending data and/or control information to the second UE.

Figure 22:
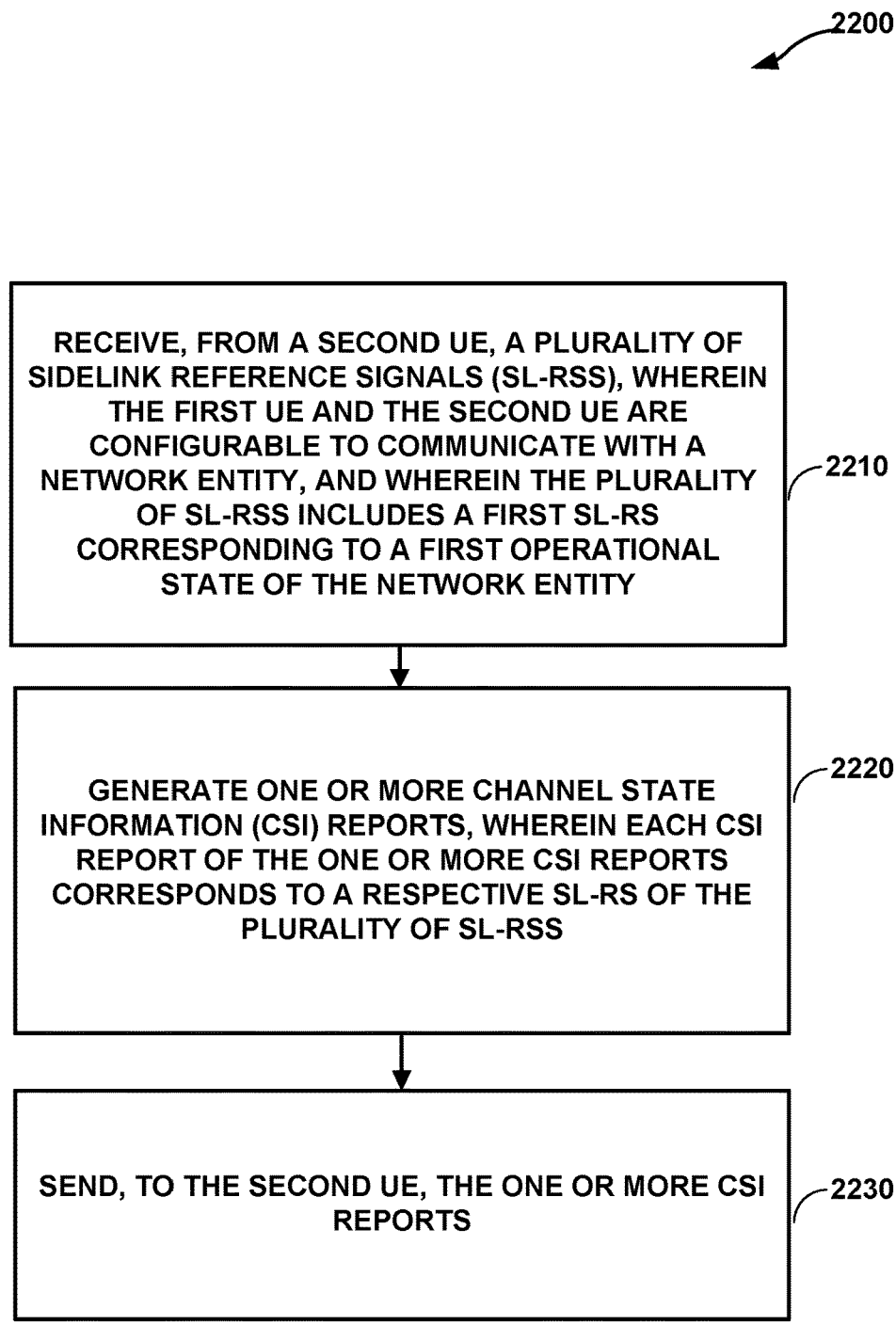
FIG. 22 is a flowchart illustrating an example of a process for receiving SL-RSs and generating CSI reports in accordance with one or more aspects of the present disclosure.

FIG. 22 is a flowchart illustrating an example of a process for receiving SL-RSs and generating CSI reports in accordance with one or more aspects of the present disclosure. The techniques of process 2200 may be performed by a UE 115 (e.g., UE 115*b* of FIG. 19) as described herein.

A first UE (e.g., UE115*b* of FIG. 19) may be configured to receive, from a second UE (e.g., UE115*a* of FIG. 19), a plurality of sidelink reference signals (SL-RSs), wherein the first UE and the second UE are configurable to communicate with a network entity, and wherein the plurality of SL-RSs includes a first SL-RS corresponding to a first operational state of the network entity (2210). As described above, the network entity may be a reflective device 190, including one of a reconfigurable intelligent surface (RIS), a reflective surface, a backscattering-capable device, a radio frequency (RF) tag, a passive UE, a backscatter UE, or an ambient Internet-of-Things (IoT) device.

The plurality of SL-RSs received by the first UE may further include a second SL-RS, wherein the second SL-RS corresponds to a second operational state of the network entity. In one example, the first operational state is an active state and the second operational state is an inactive state. In one example, the first UE is configured to receive, from the second UE via the network entity, each respective SL-RS of the plurality of SL-RSs that corresponds to the first operational state, and receive, from the second UE without use of the network entity, each respective SL-RS of the plurality of SL-RSs that corresponds to second first operational state.

In another example, the plurality of SL-RSs includes a third SL-RS corresponding to the first operational state of the network entity, and wherein, to receive the plurality of SL-RSs, the first UE is configured to receive a physical sidelink shared channel (PSSCH) transmission including the plurality of SL-RSs and control information. In one example, the control information is indicative of a respective operational state of the network entity corresponding to each respective SL-RS of the plurality of SL-RSs. In one example, the first UE may receive the plurality of SL-RSs over a bandwidth that is wider than a PSSCH.

In another example, each SL-RS of the plurality of SL-RSs corresponds to the first operational state of the network entity, and the first UE is configured to receive a demodulation reference signal (DMRS) corresponding to a second operational state of the network entity.

The first UE may further be configured to generate one or more channel state information (CSI) reports, wherein each CSI report of the one or more CSI reports corresponds to a respective SL-RS of the plurality of SL-RSs (2220), and send, to the second UE, the one or more CSI reports (2230). In one example, the control information referenced above is CSI report configuration information. The control information may be indicative of a respective report type corresponding to each respective SL-RS of the plurality of SL-RSs.

In one example, the respective report type corresponding to each respective SL-RS of the plurality of SL-RSs is one of a first report type or a second report type. In one example, the first report type is a non-legacy report type and the second report type is a legacy report type. In some examples, each CSI report of the one or more CSI reports is based on one of the first report type or the second report type.

In another example, the CSI report configuration information includes a first CSI report type for a first CSI report corresponding to the first SL-RS and a second CSI report type for a second CSI report corresponding to a second SL-RS, wherein the second SL-RS corresponds to a second operational state of the network entity, and wherein the first CSI report type is different than the second CSI report type. In some examples, the CSI report configuration information includes information indicative of one or more of a latency corresponding to CSI reporting or a minimum CSI reporting time. The first UE may be configured to receive the CSI report configuration information in sidelink control information (SCI).

In some examples, the first UE may be configured to send the one or more CSI reports in a single media access control-control element (MAC-CE). In other examples, the first UE may be configured to send the one or more CSI reports in a multiple-entry MAC-CE. Details of the types of reports were described above with reference to FIGS. 8-18.

The following numbered clauses illustrate one or more aspects of the devices and techniques described in this disclosure.

Aspect 1—A first user equipment (UE) for wireless communication, the first UE comprising: a processor; and a memory accessible by the processor, wherein, the processor is configured to: send, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; receive, from the second UE, one or more channel state information (CSI) reports, wherein each CSI report of the one or more CSI reports corresponds to a respective SL-RS of the plurality of SL-RSs; and send information based on one or more CSI reports of the one or more CSI reports.

Aspect 2—The first UE of Aspect 1, wherein the plurality of SL-RSs further includes a second SL-RS, wherein the second SL-RS corresponds to a second operational state of the network entity.

Aspect 3—The first UE of Aspect 2, wherein the first operational state is an active state and the second operational state is an inactive state.

Aspect 4—The first UE of any Aspects 2-3, wherein, to send the plurality of SL-RSs, the processor is configured to: send, to the second UE via the network entity, each respective SL-RS of the plurality of SL-RSs that corresponds to the first operational state; and send, to the second UE without use of the network entity, each respective SL-RS of the plurality of SL-RSs that corresponds to second first operational state.

Aspect 5—The first UE of any Aspects 2-4, wherein the plurality of SL-RSs includes a third SL-RS corresponding to the first operational state of the network entity, and wherein, to send the plurality of SL-RSs, the processor is configured to: send a physical sidelink shared channel (PSSCH) transmission including the plurality of SL-RSs and control information.

Aspect 6—The first UE of Aspect 5, wherein the control information is indicative of a respective operational state of the network entity corresponding to each respective SL-RS of the plurality of SL-RSs.

Aspect 7—The first UE of any of Aspects 5-6, wherein the control information is CSI report configuration information.

Aspect 8—The first UE of any of Aspects 5-7, wherein the control information is indicative of a respective report type corresponding to each respective SL-RS of the plurality of SL-RSs.

Aspect 9—The first UE of Aspect 8, wherein the respective report type corresponding to each respective SL-RS of the plurality of SL-RSs is one of a first report type or a second report type.

Aspect 10—The first UE of Aspect 9, wherein the first report type is a non-legacy report type and the second report type is a legacy report type.

Aspect 11—The first UE of any of Aspects 10-11, wherein each CSI report of the one or more CSI reports is based on one of the first report type or the second report type.

Aspect 12—The first UE of Aspect 1, wherein each SL-RS of the plurality of SL-RSs corresponds to the first operational state of the network entity, and wherein the processor is configured to: send a demodulation reference signal (DMRS) corresponding to a second operational state of the network entity.

Aspect 13—The first UE of any of Aspects 1-11, wherein, to send the plurality of SL-RSs, the processor is configured to: send the plurality of SL-RSs using a bandwidth that is wider than a physical sidelink shared channel (PSSCH).

Aspect 14—The first UE of any of Aspects 1-13, wherein the processor is configured to: send CSI report configuration information to the second UE, wherein the CSI report configuration information includes information indicative of a respective CSI report type for each respective CSI report of the one or more CSI reports.

Aspect 15—The first UE of Aspect 14, wherein the CSI report configuration information includes a first CSI report type for a first CSI report corresponding to the first SL-RS and a second CSI report type for a second CSI report corresponding to a second SL-RS, wherein the second SL-RS corresponds to a second operational state of the network entity, and wherein the first CSI report type is different than the second CSI report type.

Aspect 16—The first UE of Aspect 14, wherein the CSI report configuration information includes information indicative of one or more of a latency corresponding to CSI reporting or a minimum CSI reporting time.

Aspect 17—The first UE of Aspect 14, wherein, to send the CSI report configuration information, the processor is configured to: send the CSI report configuration information in sidelink control information (SCI).

Aspect 18—The first UE of any of Aspects 1-17, wherein, to receive the one or more CSI reports, the processor is configured to: receive the one or more CSI reports in a single media access control-control element (MAC-CE).

Aspect 19—The first UE of Aspect 18, wherein the single-MAC-CE includes information indicative of: one or more best beams corresponding to the plurality of SL-RSs, and a respective reference signal received power (RSRP) corresponding to each respective beam of the one or more beams.

Aspect 20—The first UE of Aspect 18, wherein the single MAC-CE includes information indicative of: a single beam corresponding to one SL-RS of the plurality of SL-RSs, and a reference signal received power (RSRP) corresponding to the single beam.

Aspect 21—The first UE of Aspect 18, wherein the single MAC-CE includes information indicative of: a best beam corresponding to one SL-RS of the plurality of SL-RSs, a worst beam corresponding to another SL-RS of the plurality of SL-RSs, and a reference signal received power (RSRP) corresponding to the best beam.

Aspect 22—The first UE of Aspect 18, wherein the single MAC-CE includes information indicative of: one or more beams corresponding to the plurality of SL-RSs, a rank indicator (RI) indicative of antenna performance, and a first report type or a second report type, wherein: the first report type indicates that each respective SL-RS of the plurality of SL-RSs corresponding to the one or more beams corresponds to the first operational state of the network entity; and the second report type indicates that each respective SL-RS of the plurality of SL-RSs corresponding to the one or more beams corresponds to a second operational state of the network entity.

Aspect 23—The first UE of Aspect 18, wherein the single MAC-CE includes information indicative of: a rank indicator (RI) indicative of antenna performance, a channel quality indicator (CQI) for one or more SL-RSs of the plurality of SL-RSs corresponding to a second operational state of the network entity, and a report for one or more SL-RSs of the plurality of SL-RSs corresponding to the first operational state of the network entity.

Aspect 24—The first UE of Aspect 18, wherein the single MAC-CE includes information indicative of: a rank indicator (RI) indicative of antenna performance, a first channel quality indicator (CQI) for one or more SL-RSs of the plurality of SL-RSs corresponding to a second operational state of the network entity, and a difference between a second CQI for one or more SL-RSs of the plurality of SL-RSs corresponding to the first operational state of the network entity and the first CQI.

Aspect 25—The first UE of Aspect 18, wherein the single MAC-CE includes information indicative of: a rank indicator (RI) indicative of antenna performance, a first channel quality indicator (CQI) for one or more SL-RSs of the plurality of SL-RSs corresponding to a second operational state of the network entity, and one or more of: a second CQI, a beam index, or a reference signal received power (RSRP) for one or more SL-RSs of the plurality of SL-RSs corresponding to the first operational state of the network entity.

Aspect 26—The first UE of Aspect 18, wherein the single MAC-CE includes information indicative of: a rank indicator (RI) indicative of antenna performance, a joint encoding of channel information for one or more SL-RSs of the plurality of SL-RSs corresponding to the first operational state of the network entity and one or more SL-RSs of the plurality of SL-RSs corresponding to a second operational state of the network entity.

Aspect 27—The first UE of any of Aspects 1-17, wherein, to receive the one or more CSI reports, the processor is configured to: receive the one or more CSI reports in a multiple-entry media access control-control element (MAC-CE).

Aspect 28—The first UE of Aspect 27, wherein the multiple-entry MAC-CE includes information indicative of: a rank indicator (RI) indicative of antenna performance, a channel quality indicator (CQI) for one or more SL-RSs of the plurality of SL-RSs corresponding to a second operational state of the network entity, and a reference signal received power (RSRP) for one or more SL-RSs of the plurality of SL-RSs corresponding to the first operational state of the network entity.

Aspect 29—The first UE of Aspect 27, wherein the multiple-entry MAC-CE includes information indicative of: a rank indicator (RI) indicative of antenna performance, a channel quality indicator (CQI) for one or more SL-RSs of the plurality of SL-RSs corresponding to the first operational state of the network entity, and a best beam index for one or more SL-RSs of the plurality of SL-RSs corresponding to the first operational state of the network entity.

Aspect 30—The first UE of any of Aspects 1-29, wherein the network entity is a reflective device comprising one of a reconfigurable intelligent surface (RIS), a reflective surface, a backscattering-capable device, a radio frequency (RF) tag, a passive UE, a backscatter UE, or an ambient Internet-of-Things (IoT) device.

Aspect 31—A first user equipment (UE) for wireless communication, the first UE comprising: a processor; and a memory accessible by the processor, wherein, the processor is configured to: receive, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; generate one or more channel state information (CSI) reports, wherein each CSI report of the one or more CSI reports corresponds to a respective SL-RS of the plurality of SL-RSs; and send, to the second UE, the one or more CSI reports.

Aspect 32—The first UE of Aspect 31, wherein the plurality of SL-RSs further includes a second SL-RS, wherein the second SL-RS corresponds to a second operational state of the network entity.

Aspect 33—The first UE of Aspect 32, wherein the first operational state is an active state and the second operational state is an inactive state.

Aspect 34—The first UE of any of Aspects 32-33, wherein, to receive the plurality of SL-RSs, the processor is configured to: receive, from the second UE via the network entity, each respective SL-RS of the plurality of SL-RSs that corresponds to the first operational state; and receive, from the second UE without use of the network entity, each respective SL-RS of the plurality of SL-RSs that corresponds to second first operational state.

Aspect 35—The first UE of any of Aspects 32-34, wherein the plurality of SL-RSs includes a third SL-RS corresponding to the first operational state of the network entity, and wherein, to receive the plurality of SL-RSs, the processor is configured to: receive a physical sidelink shared channel (PSSCH) transmission including the plurality of SL-RSs and control information.

Aspect 36—The first UE of Aspect 35, wherein the control information is indicative of a respective operational state of the network entity corresponding to each respective SL-RS of the plurality of SL-RSs.

Aspect 37—The first UE of any of Aspects 35-36, wherein the control information is CSI report configuration information.

Aspect 38—The first UE of any of Aspects 35-36, wherein the control information is indicative of a respective report type corresponding to each respective SL-RS of the plurality of SL-RSs.

Aspect 39—The first UE of Aspect 38, wherein the respective report type corresponding to each respective SL-RS of the plurality of SL-RSs is one of a first report type or a second report type.

Aspect 40—The first UE of Aspect 39, wherein the first report type is a non-legacy report type and the second report type is a legacy report type.

Aspect 41—The first UE of any of Aspects 39-40, wherein each CSI report of the one or more CSI reports is based on one of the first report type or the second report type.

Aspect 42—The first UE of Aspect 31, wherein each SL-RS of the plurality of SL-RSs corresponds to the first operational state of the network entity, and wherein the processor is configured to: receive a demodulation reference signal (DMRS) corresponding to a second operational state of the network entity.

Aspect 43—The first UE of any of Aspects 31-41, wherein, to receive the plurality of SL-RSs, the processor is configured to: receive the plurality of SL-RSs on a bandwidth that is wider than a physical sidelink shared channel (PSSCH).

Aspect 44—The first UE of any of Aspects 31-43, wherein the processor is configured to: receive CSI report configuration information from the second UE, wherein the CSI report configuration information includes information indicative of a respective CSI report type for each respective CSI report of the one or more CSI reports.

Aspect 45—The first UE of Aspect 44, wherein the CSI report configuration information includes a first CSI report type for a first CSI report corresponding to the first SL-RS and a second CSI report type for a second CSI report corresponding to a second SL-RS, wherein the second SL-RS corresponds to a second operational state of the network entity, and wherein the first CSI report type is different than the second CSI report type.

Aspect 46—The first UE of Aspect 44, wherein the CSI report configuration information includes information indicative of one or more of a latency corresponding to CSI reporting or a minimum CSI reporting time.

Aspect 47—The first UE of Aspect 44, wherein, to receive the CSI report configuration information, the processor is configured to: receive the CSI report configuration information in sidelink control information (SCI).

Aspect 48—The first UE of any of Aspects 31-47, wherein, to send the one or more CSI reports, the processor is configured to: send the one or more CSI reports in a single media access control-control element (MAC-CE).

Aspect 49—The first UE of Aspect 38, wherein the single-MAC-CE includes information indicative of: one or more best beams corresponding to the plurality of SL-RSs, and a respective reference signal received power (RSRP) corresponding to each respective beam of the one or more beams.

Aspect 50—The first UE of Aspect 38, wherein the single MAC-CE includes information indicative of: a single beam corresponding to one SL-RS of the plurality of SL-RSs, and a reference signal received power (RSRP) corresponding to the single beam.

Aspect 51—The first UE of Aspect 38, wherein the single MAC-CE includes information indicative of: a best beam corresponding to one SL-RS of the plurality of SL-RSs, a worst beam corresponding to another SL-RS of the plurality of SL-RSs, and a reference signal received power (RSRP) corresponding to the best beam.

Aspect 52—The first UE of Aspect 38, wherein the single MAC-CE includes information indicative of: one or more beams corresponding to the plurality of SL-RSs, a rank indicator (RI) indicative of antenna performance, and a first report type or a second report type, wherein: the first report type indicates that each respective SL-RS of the plurality of SL-RSs corresponding to the one or more beams corresponds to the first operational state of the network entity; and the second report type indicates that each respective SL-RS of the plurality of SL-RSs corresponding to the one or more beams corresponds to a second operational state of the network entity.

Aspect 53—The first UE of Aspect 38, wherein the single MAC-CE includes information indicative of: a rank indicator (RI) indicative of antenna performance, a channel quality indicator (CQI) for one or more SL-RSs of the plurality of SL-RSs corresponding to a second operational state of the network entity, and a report for one or more SL-RSs of the plurality of SL-RSs corresponding to the first operational state of the network entity.

Aspect 54—The first UE of Aspect 38, wherein the single MAC-CE includes information indicative of: a rank indicator (RI) indicative of antenna performance, a first channel quality indicator (CQI) for one or more SL-RSs of the plurality of SL-RSs corresponding to a second operational state of the network entity, and a difference between a second CQI for one or more SL-RSs of the plurality of SL-RSs corresponding to the first operational state of the network entity and the first CQI.

Aspect 55—The first UE of Aspect 38, wherein the single MAC-CE includes information indicative of: a rank indicator (RI) indicative of antenna performance, a first channel quality indicator (CQI) for one or more SL-RSs of the plurality of SL-RSs corresponding to a second operational state of the network entity, and one or more of: a second CQI, a beam index, or a reference signal received power (RSRP) for one or more SL-RSs of the plurality of SL-RSs corresponding to the first operational state of the network entity.

Aspect 56—The first UE of Aspect 38, wherein the single MAC-CE includes information indicative of: a rank indicator (RI) indicative of antenna performance, a joint encoding of channel information for one or more SL-RSs of the plurality of SL-RSs corresponding to the first operational state of the network entity and one or more SL-RSs of the plurality of SL-RSs corresponding to a second operational state of the network entity.

Aspect 57—The first UE of any of Aspects 31-47, wherein, to send the one or more CSI reports, the processor is configured to: send the one or more CSI reports in a multiple-entry media access control-control element (MAC-CE).

Aspect 58—The first UE of Aspect 57, wherein the multiple-entry MAC-CE includes information indicative of: a rank indicator (RI) indicative of antenna performance, a channel quality indicator (CQI) for one or more SL-RSs of the plurality of SL-RSs corresponding to a second operational state of the network entity, and a reference signal received power (RSRP) for one or more SL-RSs of the plurality of SL-RSs corresponding to the first operational state of the network entity.

Aspect 59—The first UE of Aspect 57, wherein the multiple-entry MAC-CE includes information indicative of: a rank indicator (RI) indicative of antenna performance, a channel quality indicator (CQI) for one or more SL-RSs of the plurality of SL-RSs corresponding to the first operational state of the network entity, and a best beam index for one or more SL-RSs of the plurality of SL-RSs corresponding to the first operational state of the network entity.

Aspect 60—The first UE of any of Aspects 31-59, wherein the network entity is a reflective device comprising one of a reconfigurable intelligent surface (RIS), a reflective surface, a backscattering-capable device, a radio frequency (RF) tag, a passive UE, a backscatter UE, or an ambient Internet-of-Things (IoT) device.

Aspect 61—A method of wireless communication by a first user equipment (UE), the method comprising: sending, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; receiving, from the second UE, one or more channel state information (CSI) reports, wherein each CSI report of the one or more CSI reports corresponds to a respective SL-RS of the plurality of SL-RSs; and sending information based on one or more CSI reports of the one or more CSI reports.

Aspect 62—A method of wireless communication by a first user equipment (UE), the method comprising: receiving, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; generating, one or more channel state information (CSI) reports, wherein each CSI report of the one or more CSI reports corresponds to a respective SL-RS of the plurality of SL-RSs; and sending, to the second UE, the one or more CSI reports.

Aspect 63—A non-transitory computer-readable storage medium storing instructions that, when executed, causes one or more processors of a first user equipment (UE) configured for wireless communication to: send, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; receive, from the second UE, one or more channel state information (CSI) reports, wherein each CSI report of the one or more CSI reports corresponds to a respective SL-RS of the plurality of SL-RSs; and send information based on one or more CSI reports of the one or more CSI reports.

Aspect 64—A non-transitory computer-readable storage medium storing instructions that, when executed, causes one or more processors of a first user equipment (UE) configured for wireless communication to: receive, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; generate, one or more channel state information (CSI) reports, wherein each CSI report of the one or more CSI reports corresponds to a respective SL-RS of the plurality of SL-RSs; and send, to the second UE, the one or more CSI reports.

Aspect 65—A first user equipment (UE) for wireless communication, the first UE comprising: means for sending, to a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; means for receiving, from the second UE, one or more channel state information (CSI) reports, wherein each CSI report of the one or more CSI reports corresponds to a respective SL-RS of the plurality of SL-RSs; and means for sending information based on one or more CSI reports of the one or more CSI reports.

Aspect 66—A first user equipment (UE) for wireless communication, the first UE comprising: means for receiving, from a second UE, a plurality of sidelink reference signals (SL-RSs), wherein the first UE and the second UE are configurable to communicate with a network entity, and wherein the plurality of SL-RSs includes a first SL-RS corresponding to a first operational state of the network entity; means for generating, one or more channel state information (CSI) reports, wherein each CSI report of the one or more CSI reports corresponds to a respective SL-RS of the plurality of SL-RSs; and means for sending, to the second UE, the one or more CSI reports.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first user equipment (UE) for wireless communication, the first UE comprising:
   one or more processors; and
   one or more memories accessible by the one or more processors, wherein the one or more processors are configured to cause the first UE to:
      send, to a second UE, a plurality of sidelink reference signals (SL-RSs), wherein the first UE and the second UE are configurable to communicate with a network entity, wherein the plurality of SL-RSs includes a first SL-RS corresponding to an active state of the network entity and a second SL-RS corresponding to an inactive state of the network entity, and wherein, to send the plurality of SL-RSs, the one or more processors are configured to cause the first UE to:
- send, to the second UE via the network entity, each respective SL-RS of the plurality of SL-RSs that corresponds to the active state, and
- send, to the second UE without use of the network entity, each respective SL-RS of the plurality of SL-RSs that corresponds to the inactive state;
- receive, from the second UE, one or more channel state information (CSI) reports, wherein each CSI report of the one or more CSI reports corresponds to a respective SL-RS of the plurality of SL-RSs; and
- send information based on one or more CSI reports of the one or more CSI reports.

2. The first UE of claim 1, wherein the plurality of SL-RSs includes a third SL-RS corresponding to the active state of the network entity, and wherein, to send the plurality of SL-RSs, the one or more processors are configured to cause the first UE to:
send a physical sidelink shared channel (PSSCH) transmission including the plurality of SL-RSs and control information.

3. The first UE of claim 2, wherein the control information is indicative of a respective operational state of the network entity corresponding to each respective SL-RS of the plurality of SL-RSs.

4. The first UE of claim 2, wherein the control information is CSI report configuration information.

5. The first UE of claim 2, wherein the control information is indicative of a respective report type corresponding to each respective SL-RS of the plurality of SL-RSs.

6. The first UE of claim 5, wherein the respective report type corresponding to each respective SL-RS of the plurality of SL-RSs is one of a first report type or a second report type.

7. The first UE of claim 6, wherein the first report type is a non-legacy report type and the second report type is a legacy report type.

8. The first UE of claim 6, wherein each CSI report of the one or more CSI reports is based on one of the first report type or the second report type.

9. The first UE of claim 1, wherein for each respective SL-RS of the plurality of SL-RSs that corresponds to the active state, and the one or more processors are configured to cause the first UE to:
send a demodulation reference signal (DMRS) corresponding to the inactive state of the network entity.

10. The first UE of claim 1, wherein, to send the plurality of SL-RSs, the one or more processors are configured to cause the first UE to:
send the plurality of SL-RSs using a bandwidth that is wider than a physical sidelink shared channel (PSSCH).

11. The first UE of claim 1, wherein the one or more processors are configured to cause the first UE to:
send CSI report configuration information to the second UE, wherein the CSI report configuration information includes information indicative of a respective CSI report type for each respective CSI report of the one or more CSI reports.

12. The first UE of claim 11, wherein the CSI report configuration information includes a first CSI report type for a first CSI report corresponding to the first SL-RS and a second CSI report type for a second CSI report corresponding to the second SL-RS, wherein the first CSI report type is different than the second CSI report type.

13. The first UE of claim 11, wherein the CSI report configuration information includes information indicative of one or more of a latency corresponding to CSI reporting or a minimum CSI reporting time.

14. The first UE of claim 11, wherein, to send the CSI report configuration information, the one or more processors are configured to cause the first UE to:
send the CSI report configuration information in sidelink control information (SCI).

15. The first UE of claim 1, wherein, to receive the one or more CSI reports, the one or more processors are configured to cause the first UE to:
receive the one or more CSI reports in a single media access control-control element (MAC-CE).

16. The first UE of claim 15, wherein the single-MAC-CE includes information indicative of:
- one or more best beams corresponding to the plurality of SL-RSs, and
- a respective reference signal received power (RSRP) corresponding to each respective beam of the one or more beams.

17. The first UE of claim 15, wherein the single MAC-CE includes information indicative of:
- a single beam corresponding to one SL-RS of the plurality of SL-RSs, and
- a reference signal received power (RSRP) corresponding to the single beam.

18. The first UE of claim 15, wherein the single MAC-CE includes information indicative of:
- a best beam corresponding to one SL-RS of the plurality of SL-RSs,
- a worst beam corresponding to another SL-RS of the plurality of SL-RSs, and
- a reference signal received power (RSRP) corresponding to the best beam.

19. The first UE of claim 15, wherein the single MAC-CE includes information indicative of:
- one or more beams corresponding to the plurality of SL-RSs,
- a rank indicator (RI) indicative of antenna performance, and
- a first report type or a second report type, wherein:
  - the first report type indicates that each respective SL-RS of the plurality of SL-RSs corresponding to the one or more beams corresponds to the active state of the network entity; and
  - the second report type indicates that each respective SL-RS of the plurality of SL-RSs corresponding to the one or more beams corresponds to the inactive state of the network entity.

20. The first UE of claim 15, wherein the single MAC-CE includes information indicative of:
- a rank indicator (RI) indicative of antenna performance,
- a channel quality indicator (CQI) for one or more SL-RSs of the plurality of SL-RSs corresponding to the inactive state of the network entity, and
- a report for one or more SL-RSs of the plurality of SL-RSs corresponding to the active state of the network entity.

21. The first UE of claim 15, wherein the single MAC-CE includes information indicative of:
- a rank indicator (RI) indicative of antenna performance,
- a first channel quality indicator (CQI) for one or more SL-RSs of the plurality of SL-RSs corresponding to the inactive state of the network entity, and
- a difference between a second CQI for one or more SL-RSs of the plurality of SL-RSs corresponding to the active state of the network entity and the first CQI.

22. The first UE of claim 15, wherein the single MAC-CE includes information indicative of:
- a rank indicator (RI) indicative of antenna performance,
- a first channel quality indicator (CQI) for one or more SL-RSs of the plurality of SL-RSs corresponding to the inactive state of the network entity, and
- one or more of: a second CQI, a beam index, or a reference signal received power (RSRP) for one or more SL-RSs of the plurality of SL-RSs corresponding to the active state of the network entity.

23. The first UE of claim 15, wherein the single MAC-CE includes information indicative of:
- a rank indicator (RI) indicative of antenna performance,
- a joint encoding of channel information for one or more SL-RSs of the plurality of SL-RSs corresponding to the active state of the network entity and one or more SL-RSs of the plurality of SL-RSs corresponding to the inactive state of the network entity.

24. The first UE of claim 1, wherein, to receive the one or more CSI reports, the one or more processors are configured to cause the first UE to:
- receive the one or more CSI reports in a multiple-entry media access control-control element (MAC-CE).

25. The first UE of claim 24, wherein the multiple-entry MAC-CE includes information indicative of:
- a rank indicator (RI) indicative of antenna performance,
- a channel quality indicator (CQI) for one or more SL-RSs of the plurality of SL-RSs corresponding to the inactive state of the network entity, and
- a reference signal received power (RSRP) for one or more SL-RSs of the plurality of SL-RSs corresponding to the active state of the network entity.

26. The first UE of claim 24, wherein the multiple-entry MAC-CE includes information indicative of:
- a rank indicator (RI) indicative of antenna performance,
- a channel quality indicator (CQI) for one or more SL-RSs of the plurality of SL-RSs corresponding to the active state of the network entity, and
- a best beam index for one or more SL-RSs of the plurality of SL-RSs corresponding to the active state of the network entity.

27. The first UE of claim 1, wherein the network entity is a reflective device comprising one of a reconfigurable intelligent surface (RIS), a reflective surface, a backscattering-capable device, a radio frequency (RF) tag, a passive UE, a backscatter UE, or an ambient Internet-of-Things (IoT) device.

28. A first user equipment (UE) for wireless communication, the first UE comprising:
- one or more processors; and
- one or more memories accessible by the one or more processors, wherein the one or more processors are configured to cause the first UE to:
  - receive, from a second UE, a plurality of sidelink reference signals (SL-RSs), wherein the first UE and the second UE are configurable to communicate with a network entity, and wherein the plurality of SL-RSs includes a first SL-RS corresponding to a first an active state of the network entity and a second SL-RS corresponding to an inactive state of the network entity, and wherein, to receive the plurality of SL-RSs, the one or more processors are configured to cause the first UE to:
    - receive, from the second UE via the network entity, each respective SL-RS of the plurality of SL-RSs that corresponds to the active state, and
    - receive, from the second UE without use of the network entity, each respective SL-RS of the plurality of SL-RSs that corresponds to the inactive state;
  - generate one or more channel state information (CSI) reports, wherein each CSI report of the one or more CSI reports corresponds to a respective SL-RS of the plurality of SL-RSs; and
  - send, to the second UE, the one or more CSI reports.

29. The first UE of claim 28, wherein the plurality of SL-RSs includes a third SL-RS corresponding to the active state of the network entity, and wherein, to receive the plurality of SL-RSs, the one or more processors are configured to cause the first UE to:
- receive a physical sidelink shared channel (PSSCH) transmission including the plurality of SL-RSs and control information.

30. The first UE of claim 28, wherein the network entity is a reflective device comprising one of a reconfigurable intelligent surface (RIS), a reflective surface, a backscattering-capable device, a radio frequency (RF) tag, a passive UE, a backscatter UE, or an ambient Internet-of-Things (IoT) device.

31. A method of wireless communication performed by a first user equipment (UE), the method comprising:
- sending, to a second UE, a plurality of sidelink reference signals (SL-RSs), wherein the first UE and the second UE are configurable to communicate with a network entity, wherein the plurality of SL-RSs includes a first SL-RS corresponding to an active state of the network entity and a second SL-RS corresponding to an inactive state of the network entity, and wherein sending the plurality of SL-RSs comprises:
  - sending, to the second UE via the network entity, each respective SL-RS of the plurality of SL-RSs that corresponds to the active state,
  - sending, to the second UE without use of the network entity, each respective SL-RS of the plurality of SL-RSs that corresponds to the inactive state;
- receiving, from the second UE, one or more channel state information (CSI) reports, wherein each CSI report of the one or more CSI reports corresponds to a respective SL-RS of the plurality of SL-RSs; and
- sending information based on one or more CSI reports of the one or more CSI reports.

32. The method of claim 31, wherein the plurality of SL-RSs includes a third SL-RS corresponding to the active state of the network entity, and wherein sending the plurality of SL-RSs comprises:
- sending a physical sidelink shared channel (PSSCH) transmission including the plurality of SL-RSs and control information.

33. The method of claim 32, wherein the control information is indicative of a respective operational state of the network entity corresponding to each respective SL-RS of the plurality of SL-RSs.

34. The method of claim 31, wherein the network entity is a reflective device comprising one of a reconfigurable intelligent surface (RIS), a reflective surface, a backscattering-capable device, a radio frequency (RF) tag, a passive UE, a backscatter UE, or an ambient Internet-of-Things (IoT) device.

* * * * *